US009535640B2

United States Patent
Iwasaki et al.

(10) Patent No.: US 9,535,640 B2
(45) Date of Patent: Jan. 3, 2017

(54) PRINTING SYSTEM, INFORMATION PROCESSING APPARATUS, COMPUTER READABLE MEDIUM, AND IMAGE FORMING APPARATUS FOR PROVIDING PRINTING SERVICES OVER A NETWORK

(71) Applicant: FUJI XEROX CO., LTD., Tokyo (JP)

(72) Inventors: Manabu Iwasaki, Yokohama (JP); Shin Ohtake, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/255,600

(22) Filed: Apr. 17, 2014

(65) Prior Publication Data
US 2015/0153981 A1    Jun. 4, 2015

(30) Foreign Application Priority Data

Dec. 4, 2013 (JP) .................................. 2013-251194
Dec. 4, 2013 (JP) .................................. 2013-251195

(51) Int. Cl.
*G06F 3/12*   (2006.01)
*H04L 29/06*  (2006.01)

(52) U.S. Cl.
CPC ........... *G06F 3/1238* (2013.01); *G06F 3/1222* (2013.01); *G06F 3/1239* (2013.01); *G06F 3/1292* (2013.01); *H04L 63/08* (2013.01)

(58) Field of Classification Search
CPC ............................. G06F 3/1238; G06F 3/1239
USPC .................. 358/1.15, 1.13; 715/274; 726/28
See application file for complete search history.

(56) References Cited

U.S. PATENT DOCUMENTS

2009/0097062 A1*  4/2009  Hayashi ............... G06F 3/1222
                                                                358/1.15
2014/0368859 A1* 12/2014  Gutnik et al. ............... 358/1.14
2014/0368865 A1* 12/2014  Gutnik et al. ............... 358/1.15

FOREIGN PATENT DOCUMENTS

JP      A-11-123859      5/1999
JP      A-2013-522774    6/2013
WO      WO 2011/115987 A2   9/2011

* cited by examiner

*Primary Examiner* — Jacky X Zheng
(74) *Attorney, Agent, or Firm* — Oliff PLC

(57) ABSTRACT

A printing system includes an information processing apparatus and an image forming apparatus, and the information processing apparatus includes: an acquiring unit that acquires identification information of the image forming apparatus in a printing service system from the image forming apparatus by a short-range communication; and a transmitting unit that transmits, to the printing service system, a setting request which contains the identification information of the image forming apparatus acquired by the acquiring unit and identification information of a user in the printing service system and which is a request for making a setting for permitting the user to use the image forming apparatus; and the image forming apparatus includes a holding unit that holds the identification information of the image forming apparatus in the printing service system in such a form that the identification information can be acquired by the acquiring unit of the information processing apparatus.

16 Claims, 17 Drawing Sheets

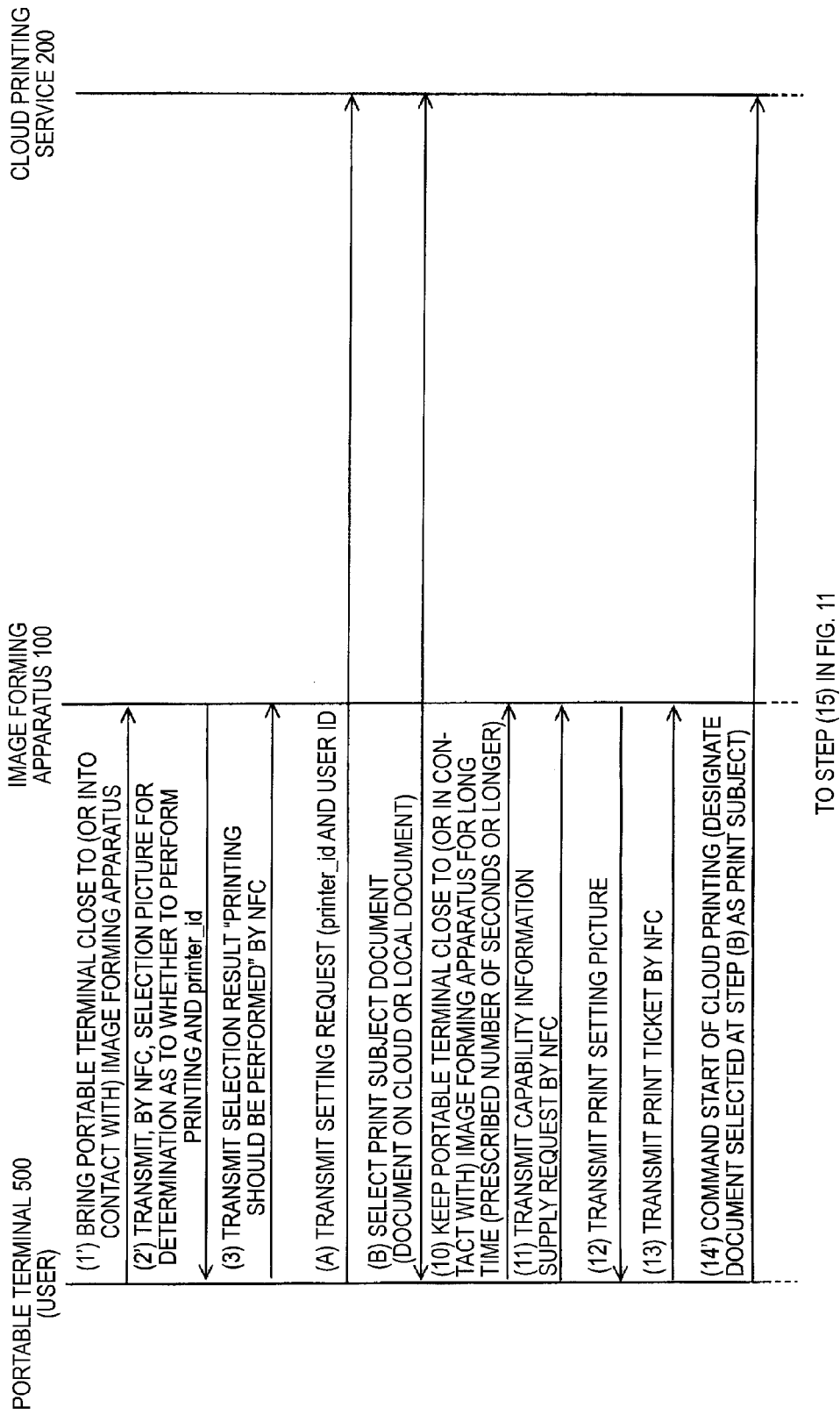

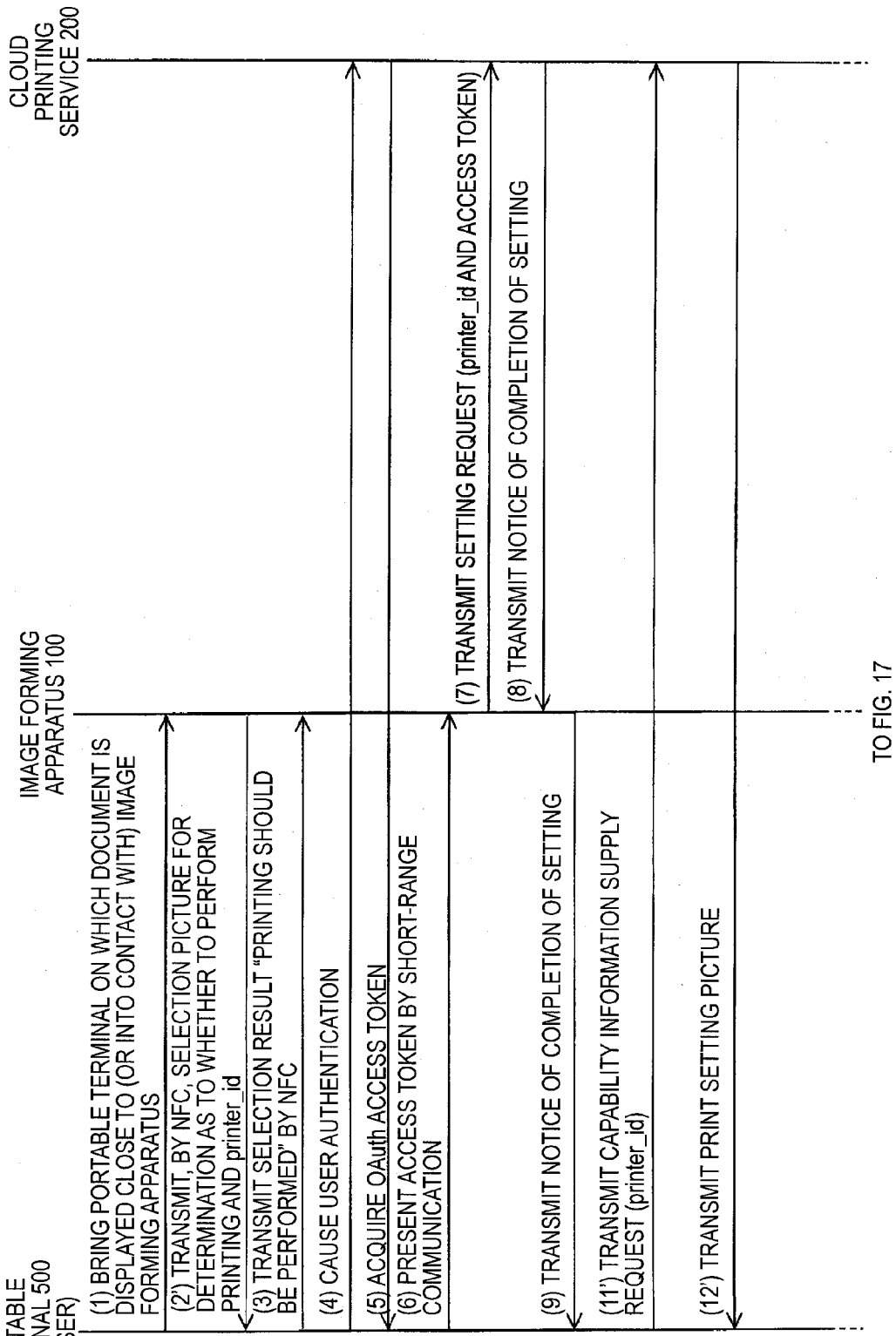

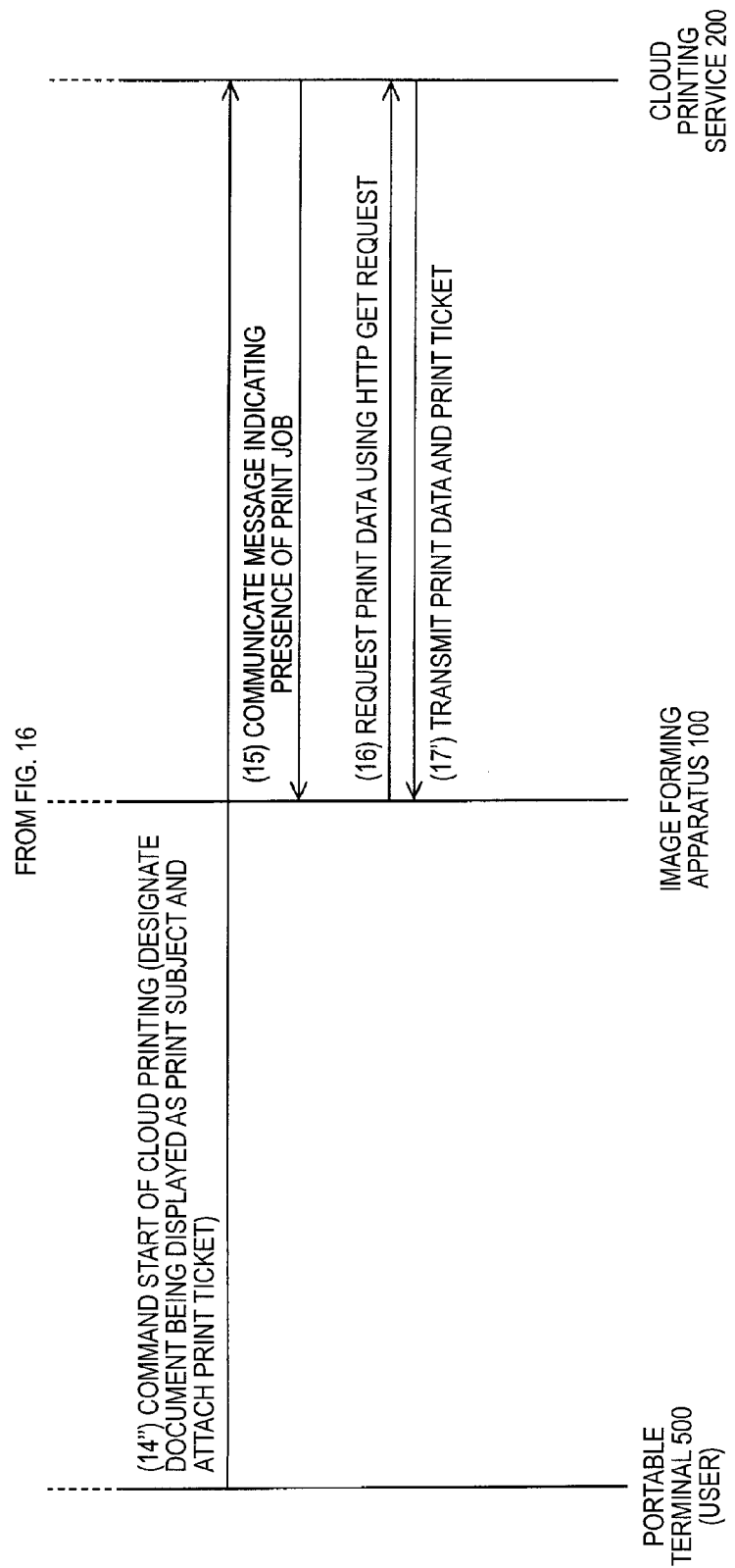

PRINTING SYSTEM, INFORMATION PROCESSING APPARATUS, COMPUTER READABLE MEDIUM, AND IMAGE FORMING APPARATUS FOR PROVIDING PRINTING SERVICES OVER A NETWORK

CROSS-REFERENCE TO RELATED APPLICATIONS

This application is based on and claims priority under 35 USC 119 from Japanese Patent Application No. 2013-251194 filed on Dec. 4, 2013 and Japanese Patent Application No. 2013-251195 filed on Dec. 4, 2013.

BACKGROUND

1. Technical Field

The present invention relates to a printing system, an information processing apparatus, a computer readable medium, and an image forming apparatus.

2. Related Art

Cloud printing services provided on the Internet, such as Google Cloud Print (trademark) of Google Inc. (registered trademark), have been proposed. A user logs in to a cloud printing service from a PC or the like using a user ID in the service, and then sends print data to the cloud printing service. The cloud printing service supplies the print data to an image forming apparatus over the Internet or the like, whereby the print data is printed.

To enable use of a public cloud printing service such as Google Cloud Print, a user registers, in advance, function information etc. of image forming apparatus he or she is to use in the cloud printing service. To use the public cloud printing service actually, the user logs in to the cloud printing service, designates a print subject document, and selects, as a printing output destination of this time, one of the image forming apparatus registered in advance. In response, the cloud printing service converts data of the print subject document into print data having a predetermined print data format such as PDF (Portable Document Format), sends the print data to the selected image forming apparatus, and causes the image forming apparatus to print the print data.

There are no problems with an image forming apparatus (e.g., home printer) a user uses usually as long as it is registered in a cloud printing service so as to be correlated with his or her account (described above). Once such registration is made, a user can cause the registered image forming apparatus produce a print output by logging in to the cloud printing service using his or her account and commanding a start of printing.

However, a user is put in a different situation when he or she attempts to use an image forming apparatus that is owned or managed by another person such as one installed in, for example, a store (e.g., convenience store) on a street or a place of visit (e.g., another section of a company the user works for or a company with which the user is doing business). In general, the registration of an image forming apparatus in a cloud printing service is a permanent one and continues unless a cancellation manipulation is made (in the case of Google Cloud Print, for example). Therefore, in general, the owner or manager of an image forming apparatus cannot accept that it is registered in a cloud printing service by an irrelevant person.

In the case of Google Cloud Print, by using its sharing function, the owner or manager of an image forming apparatus can permit another person to use the image forming apparatus that has been registered in Google Cloud Print by the owner or manager. For example, a user can cause an image forming apparatus installed at a place of visit to produce a print output via a cloud printing service using the account of the owner or manager of the image forming apparatus by having the owner or manager make an account sharing setting in advance.

However, this method which uses the sharing function necessitates complicated work because it is necessary to have the owner or the like of an image forming apparatus a user wants to use make a sharing setting in advance. Furthermore, the owner or the like needs to cancel the sharing setting once printing over a cloud is completed, which is another piece of complicated work. In the case of image forming apparatus to be used by a large number of indefinite customers such as ones installed in convenience stores etc., in practice it is almost impossible for the owners or the like to make such a sharing setting in advance and canceling it after the use. Furthermore, requesting such a sharing setting in advance is very difficult in the case where a user wants to use an image forming apparatus installed at a place that is not scheduled to visit in advance.

Consider an example case that a user browse or display a document on a portable terminal such as a smartphone and tries to print the document via a cloud printing service using an image forming apparatus installed at a place of visit as an output destination. In this case, it is convenient if the user can make print settings such as a sheet type and the number of copies on the screen of the portable terminal.

SUMMARY

A first aspect of the invention provides a printing system comprising an information processing apparatus and an image forming apparatus, wherein the information processing apparatus comprises an acquiring unit for acquiring identification information of the image forming apparatus in a printing service system from the image forming apparatus by a short-range communication; and a transmitting unit for transmitting, to the printing service system, a setting request which contains the identification information of the image forming apparatus acquired by the acquiring unit and identification information of a user in the printing service system and which is a request for making a setting for permitting the user to use the image forming apparatus, and wherein the image forming apparatus comprises a holding unit for holding the identification information of the image forming apparatus in the printing service system in such a form that it can be acquired by the acquiring unit of the information processing apparatus.

A second aspect of the invention provides a printing system comprising an information processing apparatus having a function of commanding printing that uses a printing service system and an image forming apparatus having a function of receiving print data transmitted from the printing service system and printing the received print data, wherein the information processing apparatus comprises an acquiring unit for acquiring capability information representing printing-related capabilities of the image forming apparatus from the image forming apparatus by a short-range communication; a print setting receiving unit for receiving a print setting from a user using the acquired capability information; and a transmission processing unit for performing processing for transmitting information representing the received print setting to the image forming apparatus, and wherein the image forming apparatus comprises a supplying unit for supplying the capability information representing the printing-related capabilities of the image forming apparatus to the information processing apparatus by a short-range communication.

BRIEF DESCRIPTION OF THE DRAWINGS

FIG. 15 shows a flow of a part of a process executed in a first modification of the second exemplary embodiment.

FIG. 16 shows a flow of a part of a process executed in a second modification of the second exemplary embodiment.

FIG. 17 shows a flow of the remaining part of the process executed in the second modification of the second exemplary embodiment.

DESCRIPTION OF SYMBOLS

100: Image forming apparatus; 102: Job receiving unit; 104: Control unit; 106: Image forming unit; 108: UI unit; 110: Physical printer ID holding unit; 112: Near field (or short-range) wireless communication unit; 120: Image code; 200: Cloud printing service; 210: Logical printer; 300: Cloud repository service; 400: Internet; 500: Portable terminal; 502: Camera; 504: Near field (or short-range) wireless communication unit; 510: Cloud printing application; 512: UI processing unit; 514: User information holding unit; 516: Physical printer ID acquiring unit; 518: Setting request transmitting unit; 1516: Access token acquiring unit; 1518: Access token supply unit; 520: Print setting unit.

DETAILED DESCRIPTION

Figure 1:
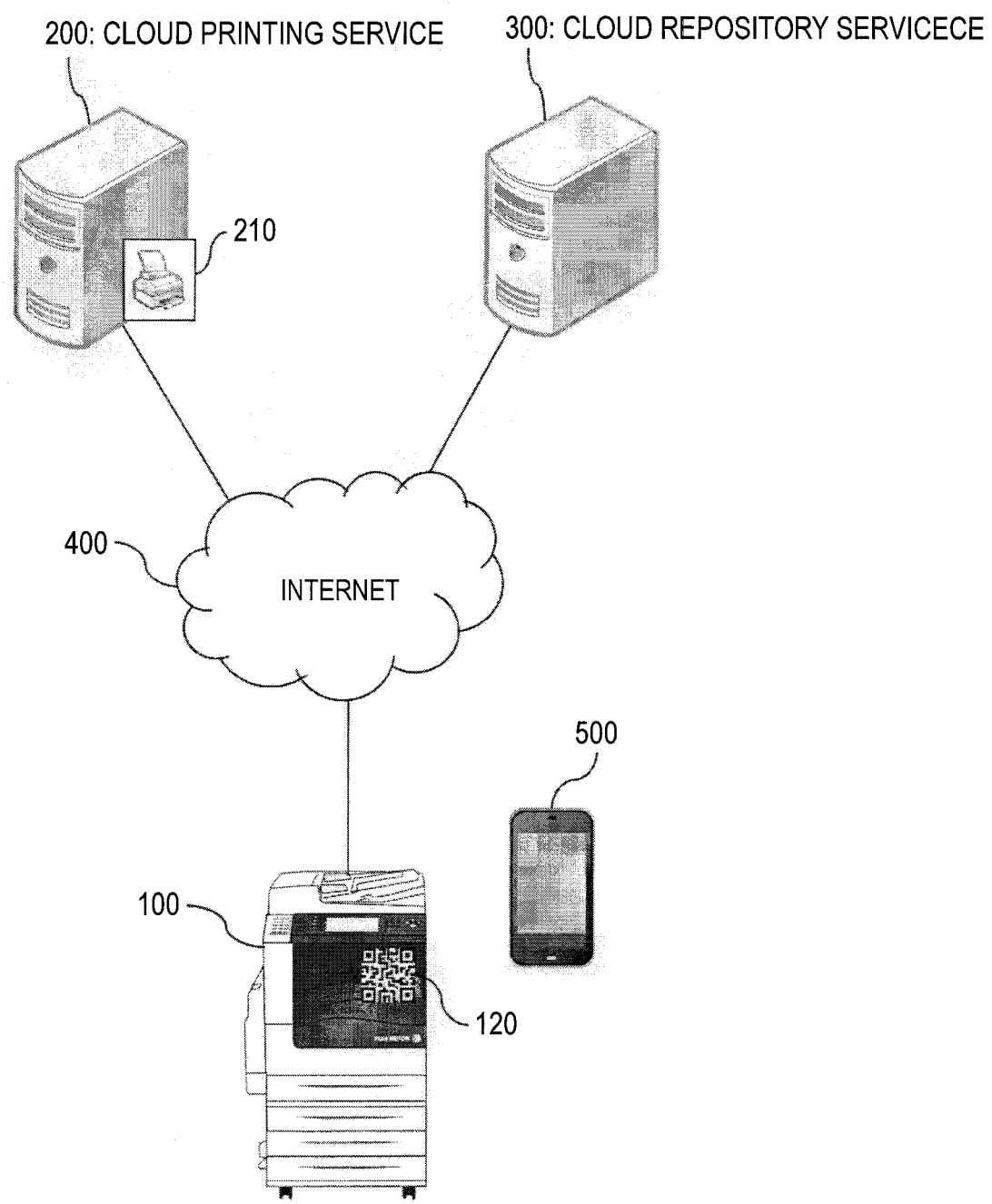
FIG. 1 shows an example system configuration according to the present invention.

An example system configuration according to the present invention will be described below with reference to FIG. 1.

This example system configuration includes an image forming apparatus 100, a cloud printing service 200, and a cloud repository service 300 which can communicate with each other over the Internet 400.

The image forming apparatus 100 is an apparatus which prints input print data on sheets. The image forming apparatus 100 may have functions other than the printing function. For example, the image forming apparatus 100 may be what is called a digital multifunction machine having, in addition to the printing function, a scanning function, a copying function, a facsimile transmission function, and an e-mail transmission function. The image forming apparatus 100 has a function of performing processing such as copying, scanning, printing, or the like according to a user instruction received by its own UI (user interface) unit 108 (see FIGS. 3 and 12) and, in addition, acquiring print data from the cloud printing service 200 on the Internet 400 and printing it. The image forming apparatus 100 may be one that is connected to a network of an organization such as a company. In this case, the image forming apparatus 100 has a function of performing processing such as printing according to an instruction from a computer that is connected to the network of the organization.

The image forming apparatus 100 also has a cloud-printing-compatible function, that is, a function of performing printing processing using the cloud printing service 200. For example, the cloud-printing-compatible function includes a function of having the image forming apparatus 100 itself registered in the cloud printing service 200 and being assigned a physical printer ID (described later), a function of receiving print data in which the image forming apparatus 100 itself is designated as an output destination by communicating with the cloud printing service 200 according to any of various protocols, and other functions. Where the image forming apparatus 100 does not have the cloud-printing-compatible function, a computer such as a PC (personal computer) having the cloud-printing-compatible function may be prepared and connected to the image forming apparatus 100. In this case, the computer acquires print data from the cloud printing service 200 by communicating with it as a proxy of the image forming apparatus 100 and passes, for printing, the acquired print data to the image forming apparatus 100.

The cloud printing service 200 is a system which provides a printing service to users over a network such as the Internet through cloud computing. In general, the cloud printing service 200 is a system consisting of plural computers; however, it may be formed by a single computer. Google Cloud Print is an example of the cloud printing service 200.

For example, the cloud printing service 200 provides users with a function of converting document data (generated by a wordprocessor, spreadsheet software, or the like) designated as a print subject by a user into print data having a format (a page description language format such as Post-Script (registered trademark) or the PDF format) that enables handling by the image forming apparatus 100, a function of generating a print job corresponding to a received print instruction and managing its execution status etc. (e.g., queue management), and other functions. The cloud printing service 200 generates and manages a logical printer (called a printer object) 210 for implementing various functions for a printing service. One or more users who use the logical printer 210 are registered in the logical printer 210. For example, the user ID of a user who commanded generation of the logical printer 210 is registered in the logical printer 210 in the form of manager attribute information of the logical printer 210. The manager can set sharers who can share the logical printer 210. The user IDs of the thus-set sharers are held by the logical printer 210 as pieces of sharer attribute information.

In general, plural logical printers 210 are held in the cloud printing service 200. Each logical printer 210 is used by one or plural users (a manager and sharers) registered therein.

One or more output destination physical printers (e.g., the image forming apparatus 100 shown in FIG. 1) to print-output print jobs in a queue of each logical printer 210 may be registered in the logical printer 210. In this case, the logical printer 210 holds management information for each registered physical printer. For example, the management information includes identification information of the physical printer (e.g., a unique printer ID assigned by the cloud printing service 200 or an IP address of the physical printer), capability information indicating capabilities (functions) of the physical printer, and other information. For example, the capability information includes such pieces of information as whether double-sided printing is possible, whether full color printing is possible, and sizes of sheets held therein. Where a physical printer is provided with a post-processing device, the capability information includes capabilities of the post-processing device (e.g., a stapling function, holes punching function, and a folding function).

A user (generates and) registers his or her account in the cloud printing service 200. In generating an account, a user registers a unique user ID in the cloud printing service 200. In the case of Google Cloud Print, a Google account which is a common account for services provided by Google Inc. is used as an account (user ID) of the user.

The cloud printing service 200 generates a logical printer 210 according to an instruction from a user. The cloud printing service 200 stores the user IDs of respective users who are registered as being permitted to use each logical printer 210. The cloud printing service 200 may be configured so as to be able to register a user as being permitted to use an existing logical printer 210 (sharing setting), according to an instruction from a user who has a user registration right for the existing logical printer 210.

A user logs in to the cloud printing service 200 over the Internet 400 from a PC, a portable terminal, the image forming apparatus 100, or the like using his or her own user ID and a communication protocol such as HTTP (Hypertext Transfer Protocol) and issues a print instruction to a selected one of logical printers 210 that are correlated with the user ID (if plural such logical printers 210 exist). The print instruction contains document data of a print subject or information specifying a print subject such as information that identifies document data (e.g., information indicating a storage location of the document data on the Internet 400 such as a URL (uniform resource locator)). The document data may exist in the cloud repository service 300 (described later). The logical printer 210 generates a print job according to the print instruction and manages it. The print job is a unit of management of a print instruction in the logical printer 210 and is assigned a unique job ID. The logical printer 210 manages pieces of information in such a manner that they are correlated with the job ID, the pieces of information including document data of a print subject, print data having a page description language format or the like obtained by converting the document data, the user ID of a user who issued the print instruction, an execution status (e.g., "not executed yet," "under execution," "execution completed," or "error") of the print job, and other information.

The logical printer 210 supplies print data held therein to an output destination physical printer designated by the user and causes the physical printer to produce a print output. Print data may be supplied to the physical printer either in such a manner that the logical printer 210 transmits the print data itself directly to the physical printer or in such a manner the logical printer 210 sends the physical printer a message containing information that identifies the print data and then supplies the print job to the physical printer in response to a supply request that is sent, according to such a protocol as HTTP, from the physical printer that has received the message (pull method). For example, pull-type printing is performed in the case where a print job of a logical printer 210 is carried out by an image forming apparatus 100 located in an internal network that is isolated from the Internet 400 by a firewall.

When a user wants to use a physical printer for printing of the cloud printing service 200, the user makes a manipulation for registering the physical printer in the cloud printing service 200. This registering manipulation allows the cloud printing service 200 to identify and authenticate the physical printer. For example, identification information of the physical printer is made knowledge common to the physical printer and the cloud printing service 200. The physical printer's presenting its own identification information (and, if necessary, authentication information that verifies its legitimacy) to the cloud printing service 200 allows the physical printer to access the cloud printing service 200.

In the case of Google Cloud Print, if a user having a Google account makes a registering manipulation through a web page dedicated to registration of a physical printer in a state that the user has logged in to Google Cloud Print, Google Cloud Print issues a physical printer ID ("printer_id") for unique identification of a registration subject physical printer. This physical printer ID is stored in the registration subject physical printer or a computer such as a PC that operates a proxy of the registration subject physical printer. Google Cloud Print stores the physical printer ID that has been assigned to the registered physical printer, so that it is correlated with the account of the user. As a result, the user who made the registering manipulation is recognized as a manager of the physical printer. Google Cloud Print sets, for the logical printer 210 corresponding to the user, the physical printer ID as the ID of one of usable printers. By presenting the physical printer ID held therein to Google Cloud Print, the physical printer or the proxy connected to it verifies that the physical printer or the proxy is a registered physical printer and acquires a print job that is held by the logical printer 210 corresponding to the physical printer.

By making sharing setting for a logical printer 210 of the manager of a physical printer, the manager can permit another user whose is registered in the cloud printing service 200 to use the logical printer 210 and a physical printer that is registered as an output destination for the logical printer 210.

The cloud repository service 300 is a system which provides a repository service to users on the Internet 400. The repository service is a service for storing data, programs, etc. and is also called an online storage service. In general, the cloud repository service 300 is a system consisting of plural computers; however, it may be formed by a single computer. Examples of the cloud repository service 300 are Google Docs (trademark), Dropbox (trademark), and Evernote (trademark).

For example, the cloud repository service 300 stores, for each user, various files such as document data and programs uploaded from the user and provides the stored files for the user. A user acquires a unique user ID from the cloud repository service 300 by making user registration in the cloud repository service 300. The user logs in to the cloud repository service 300 using the acquired user ID and uploads or downloads a file. However, between services that cooperate for user authentication such as Google Cloud Print and Google Docs, a user can use a second service from a first service if he or she logs in to the first service using an account of the user for the first service (or an account for such a service as Google Cloud Print that is valid for use of all such services). In the following description, to simplify the description, it is assumed that the cloud repository service 300 and the cloud printing service 200 cooperate in terms of user authentication.

The portable terminal 500 is an information processing apparatus to be carried by a user. Examples of the portable terminal 500 are a smartphone, a tablet terminal, and a cellphone. The portable terminal 500 can access services on the Internet 400 such as the cloud printing service 200. An application (hereinafter referred to as a cloud printing application) to serve as a UI (user interface) to be used in instructing the cloud printing service 200 to perform printing is installed in the portable terminal 500.

In the example being discussed, it is assumed that a user who carries the portable terminal 500 has an account for the cloud printing service 200. It is also assumed that the image forming apparatus 100 has already been registered in the cloud printing service 200 by its manager and is assigned a physical printer ID. However, in this example, it is assumed that the user of the portable terminal 500 is different from the manager of the image forming apparatus 100 who is registered in the cloud printing service 200. In this case, although the user of the portable terminal 500 can use the cloud printing service 200 from the portable terminal 500, in the prior art he or she cannot designate the image forming apparatus 100 as an output destination (if no sharing setting (described above) is made).

A description will be made below of a mechanism which makes it possible to perform printing via the cloud printing service 200 using the image forming apparatus 100 as an output destination.

In this mechanism, the user of the portable terminal 500 makes, in the cloud printing service 200, a setting for enabling provisional or temporary use of the image forming apparatus 100 installed in a place of visit, for example. This setting is called a provisional printer setting. In the provisional printer setting, setting information that contains a corresponding relationship between the user ID of the user and the physical printer ID of the image forming apparatus 100 and indicates that the user can use the image forming apparatus 100 is registered in the cloud printing service 200.

For example, such setting information may be registered in a database that can be searched using a user ID or a physical printer ID as a search key. In this case, when receiving an instruction that designates an output destination physical printer from a user, the cloud printing service 200 checks whether a corresponding relationship between the user and the physical printer is registered in the database and, if it is registered, judges that the user is permitted to produce a print output from the physical printer.

Another example is possible in which such setting information is held by a logical printer 210. That is, a logical printer 210 in which the user of the portable terminal 500 is set as a manager or a sharer and the image forming apparatus 100 is set as an output destination candidate is prepared in the cloud printing service 200. A corresponding relationship between the user ID of the user who is set as a manager or a sharer and the physical printer ID of the image forming apparatus 100 that is set as an output destination candidate corresponds to setting information as mentioned above. The following description will be made using, as a typical example, this method in which setting information for permitting the user of the portable terminal 500 to use the image forming apparatus 100 is held by a logical printer 210.

In this method, the provisional printer setting has several specific modes (variations). In one mode, a new logical printer 210 is generated in which the physical printer ID of the physical printer concerned is set as that of an output destination candidate as part of a provisional printer setting. In this case, the user ID of the user who makes a provisional printer setting (i.e., the user of the portable terminal 500) is set as a manager attribute. In another mode, the physical printer ID of the physical printer concerned is registered as that of an output destination candidate in an existing logical printer 210 in which the user who makes a provisional printer setting is set as its manager. In either mode, making such a provisional printer setting is generation or alteration of a logical printer 210 by the user himself or herself and hence within the ordinary authority of the user.

A further example is possible in which the user ID of the user who makes a provisional printer setting is set as that of a user (sharer) who is permitted to use a logical printer 210 for which the manager of the image forming apparatus 100 has management authority (i.e., a logical printer 210 in which the physical printer ID of the image forming apparatus 100 is registered as that of an output destination) in the logical printer 210 as part of a provisional printer setting, as long as the manager of the image forming apparatus 100 permits that in advance. If the manager of the image forming apparatus 100 makes, for example, a setting that permits any user to make a sharing setting, in a logical printer 210 (provided in the cloud printing service 200 and having the image forming apparatus 100 as an output destination) of the manager of the image forming apparatus 100, making a provisional printer setting is enabled in this mode. Instead of unconditionally permitting any user to make a sharing setting in a logical printer 210 of the manager of the image forming apparatus 100, a user may be permitted to make a sharing setting only through a setting request (described later; i.e., a setting request containing the user ID of a requester and the physical printer ID of the image forming apparatus 100 which is set as an output destination of the logical printer 210).

Exemplary Embodiment 1

To realize such a provisional printer setting, the image forming apparatus 100 is provided with a means for communicating its own physical printer ID to the portable terminal 500 of the user who is going to use the image forming apparatus 100. In one example (see FIG. 1), a label bearing an image code 120 representing the physical printer ID of the image forming apparatus 100 assigned by the cloud printing service 200 is stuck to the surface of its body. For example, the image forming apparatus 100 has a function of printing the image code 120 of its own physical printer ID held therein. When receiving an instruction to perform this function, the image forming apparatus 100 prints the image code 120 of its own physical printer ID on a sheet. The manager sticks the printed image code 120 on the surface of the image forming apparatus 100. No limitations are imposed on the form of the image code 120 representing the physical printer ID; it may be a bar code, a QR code (registered trademark), or the like. The portable terminal 500 shoots the image code 120 with the built-in camera and determines a value of the physical printer ID represented by the image code 120 by analyzing an image taken. If the portable terminal 500 is capable of character recognition, a label on which the physical printer ID is written in the form of a character string may be stuck to the body of the image forming apparatus 100 instead of the image code 120. It is also possible to display such information as the image code 120 representing the physical printer ID on a user interface display screen of the image forming apparatus 100 and shoot the displayed information with the camera of the portable terminal 500.

In another example, the image forming apparatus 100 communicates its own physical printer ID held therein to the portable terminal 500 by a short-range wireless communication method such as NFC (near field communication), Bluetooth (registered trademark), or WiFi. Still another method is conceivable in which a non-radio short-range communication means such as infrared communication is used for communicating the physical printer ID to the portable terminal 500 which is located within a communication range of the short-range communication means. A further example is possible in which the image forming apparatus 100 is provided with plural means for communicating the physical printer ID and the portable terminal 500 acquires the physical printer ID using one of those means with which the portable terminal 500 is compatible.

The method in which the image code 120 that is printed on a label stuck to the image forming apparatus 100 (or displayed on the screen) is taken by the camera of the portable terminal 500 is also a method that cannot be performed without bringing the portable terminal 500 close to the image forming apparatus 100. Therefore, this method can also be categorized as one version of transmission of the physical printer ID by short-range communication. This method and the methods using NFC, infrared communication, etc. have in common the feature that the portable terminal 500 is coupled to the image forming apparatus 100 by bringing the portable terminal 500 close to the image forming apparatus 100.

On the other hand, the portable terminal 500 has a provisional printer setting function of acquiring the physical printer ID from the image forming apparatus 100 and performing a provisional printer setting (described above) using the acquired physical printer ID. This setting function may be either included in the above-mentioned cloud printing application or implemented as an application that is separate from the cloud printing application. Or the provisional setting function may be incorporated in an application having a function of displaying a document that can be a print subject, such as a document browsing application, a document edit application, a web browser, or an e-mail client. Furthermore, the portable terminal 500 may be configured so that such an application having the document display function can call the provisional printer setting function.

The provisional printer setting function generates setting request data containing the physical printer ID of the image forming apparatus 100 acquired from it and the user ID (account information) of the user in the cloud printing service 200 and transmits the generated setting request data to the cloud printing service 200. In response, the cloud printing service 200 sets the image forming apparatus 100 as a physical printer that can be used by the user in such a manner that its physical printer ID is correlated with the user account of the user who carries the portable terminal 500.

Figure 2:
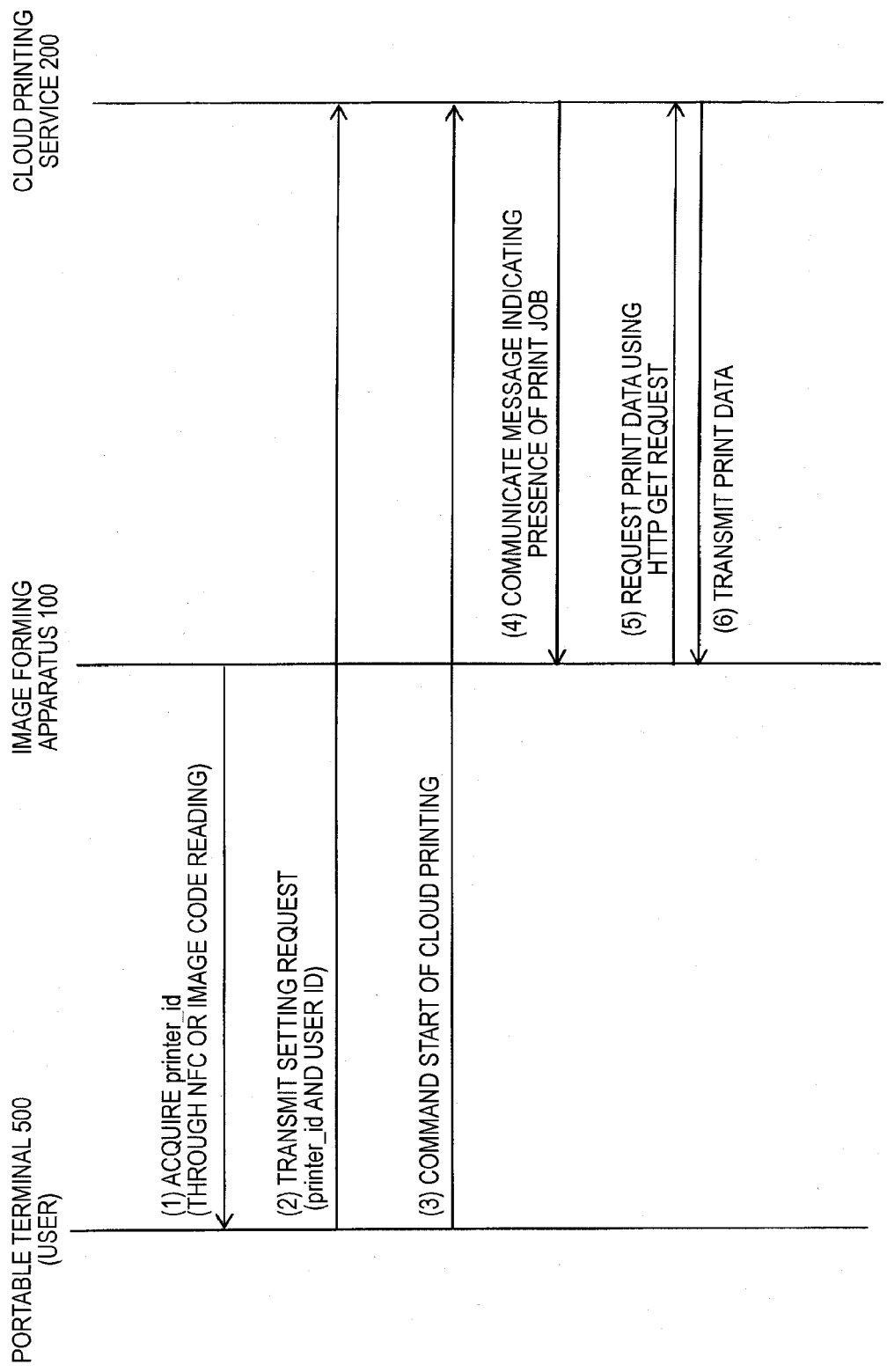
FIG. 2 shows a flow of a process executed in a first exemplary embodiment.

FIG. 2 shows a flow of a process that the portable terminal 500 causes the image forming apparatus 100 to produce a print output via the cloud printing service 200.

(1) When the user who carries the portable terminal 500 wants to use the image forming apparatus 100 which is located at a place of visit, in one example, the user activates the above-mentioned provisional printer setting function (or an application having that function) in the portable terminal 500 and acquires the physical printer ID ("printer_id") from the image forming apparatus 100. Where NFC is used for communication of the physical printer ID, the portable terminal 500 in which the provisional printer setting function is activated is brought close to (or into contact with) an NFC communication reader/writer unit of the image forming apparatus 100, whereby the provisional printer setting function communicates with the image forming apparatus 100 through NFC and acquires the physical printer ID from the image forming apparatus 100.

The portable terminal 500 and the image forming apparatus 100 may be configured so that the provisional printer setting function is activated when it is brought close to the reader/writer unit of the image forming apparatus 100. For example, when the portable terminal 500 is brought close to the reader/writer unit of the image forming apparatus 100, a notice to the effect that the image forming apparatus 100 is a printer (or a printer that is temporarily usable because of the mechanism according to the exemplary embodiment) is transmitted from the image forming apparatus 100 to the portable terminal 500 by NFC communication. When receiving the notice, the OS (operating system) of the portable terminal 500 activates the provisional printer setting function. The portable terminal 500 acquires the physical printer ID from the image forming apparatus 100 using the provisional printer setting function. The physical printer ID may be transmitted from the image forming apparatus 100 either together with the notice to the effect that the image forming apparatus 100 is a printer or after the transmission of the notice in response to a request from, for example, the provisional printer setting function.

In another example, when the image code 120 that is printed on a label stuck to the image forming apparatus 100 is shot by the built-in camera of the portable terminal 500 in a state that the provisional printer setting function in activated, the provisional printer setting function determines the physical printer ID from an image taken. In still another example, when the provisional printer setting function is activated, an image code shooting picture is displayed on the screen of the portable terminal 500. If the image code 120 is shot by the built-in camera of the portable terminal 500 in this state, the provisional printer setting function analyzes an image of the image code 120 thus taken and determines the physical printer ID represented by the image code 120.

(2) The provisional printer setting function generates a setting request that contains the acquired physical printer ID and the user ID of the user who carries the portable terminal 500 in the cloud printing service 200, and transmits the generated setting request to the cloud printing service 200 over the Internet 400. The user ID may either be input by the user when it becomes necessary or registered in the OS or the application of the portable terminal 500 by the user in advance. The data format of a setting request is determined by the cloud printing service 200 in advance, and the application generates a setting request according to that data format.

Receiving the setting request from the portable terminal 500, the cloud printing service 200 makes a provisional printer setting (described above) according to the setting request. More specifically, the cloud printing service 200 registers in itself setting information in which the physical printer ID of the image forming apparatus 100 (output destination candidate) contained in the setting request is correlated with the user ID also contained in the setting request. In this example, as described above, a new logical printer 210 having the setting information is generated or an existing logical printer 210 is altered so as to hold the setting information.

With the above setting processing, the user who carries the portable terminal 500 is permitted to produce a print output from the image forming apparatus 100 via the cloud printing service 200.

The cloud printing service 200 may inform the portable terminal 500 of completion of the setting upon completion of the setting. In this case, it is possible to notify the user of the fact that the image forming apparatus 100 has become usable by displaying a message corresponding to the notice on the screen of the portable terminal 500.

(3) Then the user accesses the cloud printing service 200 from the portable terminal 500 and instructs the cloud printing service 200 to perform printing. For example, if the portable terminal 500 activates the cloud printing application and logs in to the cloud printing service 200, a list of logical printers 210 that can be used by the user (i.e., logical printers 210 in which the user is registered as a manager or a sharer) is supplied. The list includes the logical printer 210 that is correlated with the image forming apparatus 100 for which the setting that permits use by the user was made at step (2). The user selects a logical printer 210 to be used this time from the list in the picture of the cloud printing application. It is assumed here that the logical printer 210 that is correlated with the image forming apparatus 100 is selected. If the list includes only one logical printer 210 that can be used by the user, selection is not necessary.

Where plural usable physical printers are set for the logical printer 210 that is correlated with the image forming apparatus 100, a list of those physical printers are supplied from the logical printer 210 to the cloud printing application. The user selects a physical printer to be used as an output destination this time. It is assumed here that the image forming apparatus 100 is selected as an output destination.

The list of logical printers 210 that is supplied from the cloud printing service 200 to the portable terminal 500 may include, for each logical printer 210, an owner (manager) name and a sharing status (e.g., shared/unshared or sharer names).

The cloud printing service 200 may be caused to automatically select the logical printer 210 corresponding to the physical printer ID acquired at step (1) by communicating the physical printer ID when the cloud printing application accesses the cloud printing service 200 at step (3).

The cloud printing service 200 may hold discrimination information indicating whether each logical printer 210 that can be used by the user was generated by ordinary registration setting made by the user or has been generated by the provisional printer setting function according to the exemplary embodiment, and include the discrimination information in the list of logical printers 210 to be supplied to the portable terminal 500. In this case, when the list is displayed by the portable terminal 500, information indicating which of the two categories each logical printer 210 falls under is shown, which allows the user to more easily select the logical printer 210 corresponding to the image forming apparatus 100 for which the provisional printer setting has just been made.

In the case of the method in which in the provisional printer setting of step (2) the physical printer ID of the image forming apparatus 100 is added as that of an output destination candidate in an existing logical printer 210 of the user of the portable terminal 500, discrimination information indicating that the physical printer ID of the image forming apparatus 100 has been added by the provisional printer setting function may be set in the logical printer 210. Also in this case, the physical printer ID of the image forming apparatus 100 that has been registered by the user using the provisional printer setting function can be displayed in such a form as to be discriminated from physical printer IDs of image forming apparatus that were generated by the ordinary registration setting function when a list of logical printers 210 that can be used by the user is displayed on the portable terminal 500.

Furthermore, in this case, the cloud printing service 200 may give, to the physical printer ID of the output destination candidate that has been additionally registered in the logical printer 210 by the provisional printer setting function, attribute information indicating that fact. This makes it possible to display the physical printer ID of the physical printer (image forming apparatus 100) that has been set by the provisional printer setting function in a different display form than physical printer IDs of physical printers that were registered by ordinary registration processing when a list of output destination physical printers registered in the logical printer 210 is supplied to the portable terminal 500 and displayed thereon. Looking at this display, the user recognizes the image forming apparatus 100 he or she is going to use this time temporarily and selects it as an output destination.

In the case of the method in which the user ID of the user of the portable terminal 500 is registered as that of a sharer in the logical printer 210 of the manager of the image forming apparatus 100 when a provisional printer setting is made at step (2), the user ID of the user who has been registered as a sharer may be given attribute information indicating that the user ID has been registered by the provisional printer setting function. When a list of logical printers 210 that can be used by the user is supplied to the portable terminal 500 from the cloud printing service 200, if the list includes a logical printer 210 in which the user of the portable terminal 500 is included as a sharer and the user ID of the user is given attribute information indicating that it has been registered by the provisional printer setting function, the logical printer 210 can be displayed on the portable terminal 500 as one set by the provisional printer setting function in such a form as to be discriminated from logical printers 210 that were generated by the ordinary registration setting function.

The user designates, as a print subject, a document stored in the portable terminal 500, the cloud repository service 300, or the like and commands a start of its printing. Where the cloud repository service 300 is cooperating with the cloud printing service 200 in terms of authentication, the user can acquire a list of documents of the user stored in the cloud repository service 300 and designate, as a print subject document, one of the documents in the list if he or she logs in to the cloud printing service 200.

The logical printer 210 acquires the print subject document designated by the user from the portable terminal 500, the cloud repository service 300, or the like and converts data of the document into a print data format. Instead of the logical printer 210's acquiring the print subject document on its own initiative, the portable terminal 500 may acquire the document from the cloud repository service 300 or the like and transmit it to the logical printer 210. A further alternative operation is possible in which the portable terminal 500 instructs the cloud repository service 300 to supply the print subject document stored therein to the cloud printing service 200 and the cloud repository service 300 transmits the document to the cloud printing service 200 in response to the instruction. If a document stored in the portable terminal 500 is designated as a print subject document, the portable terminal 500 transmits it to the cloud printing service 200.

Either of designation of a logical printer 210 to be used (and, if necessary, an output destination physical printer) and designation of a print subject document may be done first.

(4) Once print data of the designated document has been prepared, the logical printer 210 transmits a message containing information that identifies the print data (e.g., a URL (uniform resource locator) of the print data) to the image forming apparatus 100 which has been designated as the output destination. In the case of Google Cloud Print, this message is transmitted via the Google Talk service using XMPP (Extensible Messaging and Presence Protocol).

(5) Receiving the message, the image forming apparatus 100 requests the cloud printing service 200 to transmit the print data, using a GET request of HTTP. This request contains the information that is contained in the received message and identifies the print data. The request may also contain the physical printer ID of the image forming apparatus 100.

(6) In response to the request, the cloud printing service 200 transmits the print data of the document designated by the user at step (3) to the image forming apparatus 100. The image forming apparatus 100 receives the print data and prints it on sheets.

After completion of the printing at step (6), the image forming apparatus 100 may inform the cloud printing service 200 of the completion of the printing and, in response, the cloud printing service 200 may inform the portable terminal 500 of the completion of the printing. At the same time as communicates the notice of completion of the printing, the cloud printing service 200 may inquire of the portable terminal 500 whether printing of another document is to follow. If in response to this inquiry the user returns an answer to the effect that no further document is to be printed, the cloud printing service 200 may delete the setting information for permitting the user to use the image forming apparatus 100.

Figure 3:
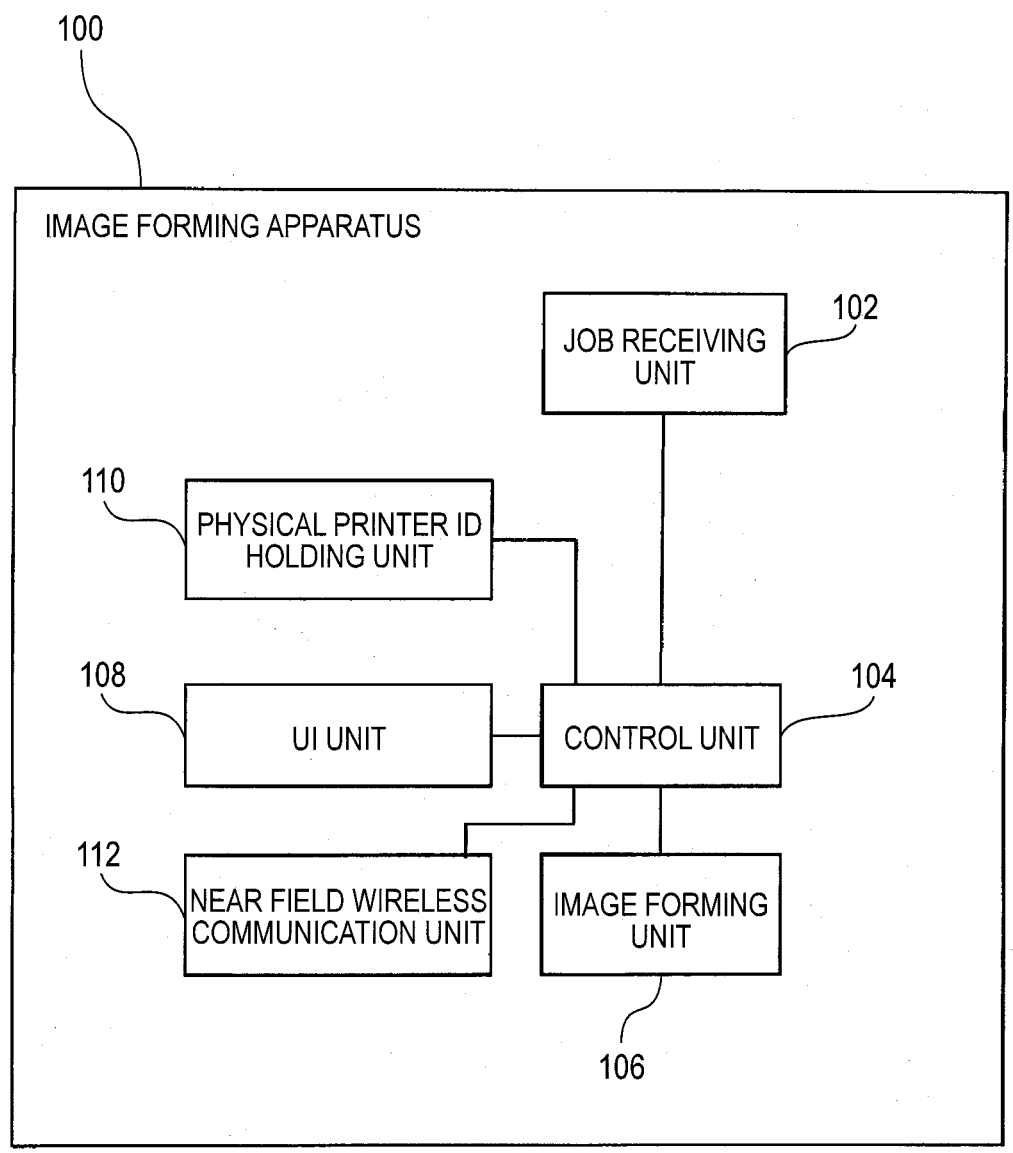
FIG. 3 shows an example functional configuration of an image forming apparatus according to the first exemplary embodiment.

Next, an example functional configuration of the image forming apparatus 100 which executes the above-described process will be described with reference to FIG. 3. It is noted that FIG. 3 shows only units that deeply relate to the process according to the exemplary embodiment and even common constituent elements of image forming apparatus are omitted if they are not very relevant to the process according to the exemplary embodiment.

In the image forming apparatus 100, a job receiving unit 102 receives am XMPP message or the like by communicating with the cloud printing service 200 and receives print data using an HTTP request which is a response to the message. An image forming unit 106 is a device for printing images on media such as sheets. A control unit 104 is a system for controlling the entire image forming apparatus 100. For example, the control unit 104 instructs an image processing unit (not shown) to convert print data received by the job receiving unit 102 from the cloud printing service 200 into image data of, for example, a raster format that can be handled by the image forming unit 106 and supplies the resulting image data to the image forming unit 106 to have the image data printed on media. Furthermore, when a manipulation for registering the image forming apparatus 100 in the cloud printing service 200 has been made, the control unit 104 stores a physical printer ID that is transmitted from the cloud printing service 200 in a physical printer ID holding unit 110.

A UI (user interface) unit 108 displays a picture through which to receive a user manipulation on the image forming apparatus 100 and receives a user manipulation through the displayed picture. For example, when receiving a physical printer ID printing instruction from the UI unit 108, the control unit 104 reads the physical printer ID from the physical printer ID holding unit 110, generates an image code representing the physical printer ID, and causes the image forming unit 106 to print the generated image code. A label bearing the image code is stuck to the surface of the image forming apparatus 100. A near field wireless communication unit 112 is a device for performing a communication according to the NFC standard. When the user brings the portable terminal 500 which is compatible with NFC close to the reader/writer unit of the image forming apparatus 100, the near field wireless communication unit 112 recognizes the NFC-compatible device (portable terminal 500). In response to this recognition, the control unit 104 supplies information indicating that the self apparatus is a printer, the physical printer ID read from the physical printer ID holding unit 110, and other information to the portable terminal 500 by an NFC communication. Although in this example the image forming apparatus 100 is equipped with, as means for supplying the physical printer ID to the portable terminal 500, the means that utilizes near field communication and the means that print-outputs the physical printer ID, this is just an example. The image forming apparatus 100 may be equipped with only one of them or another kind of means.

Figure 4:
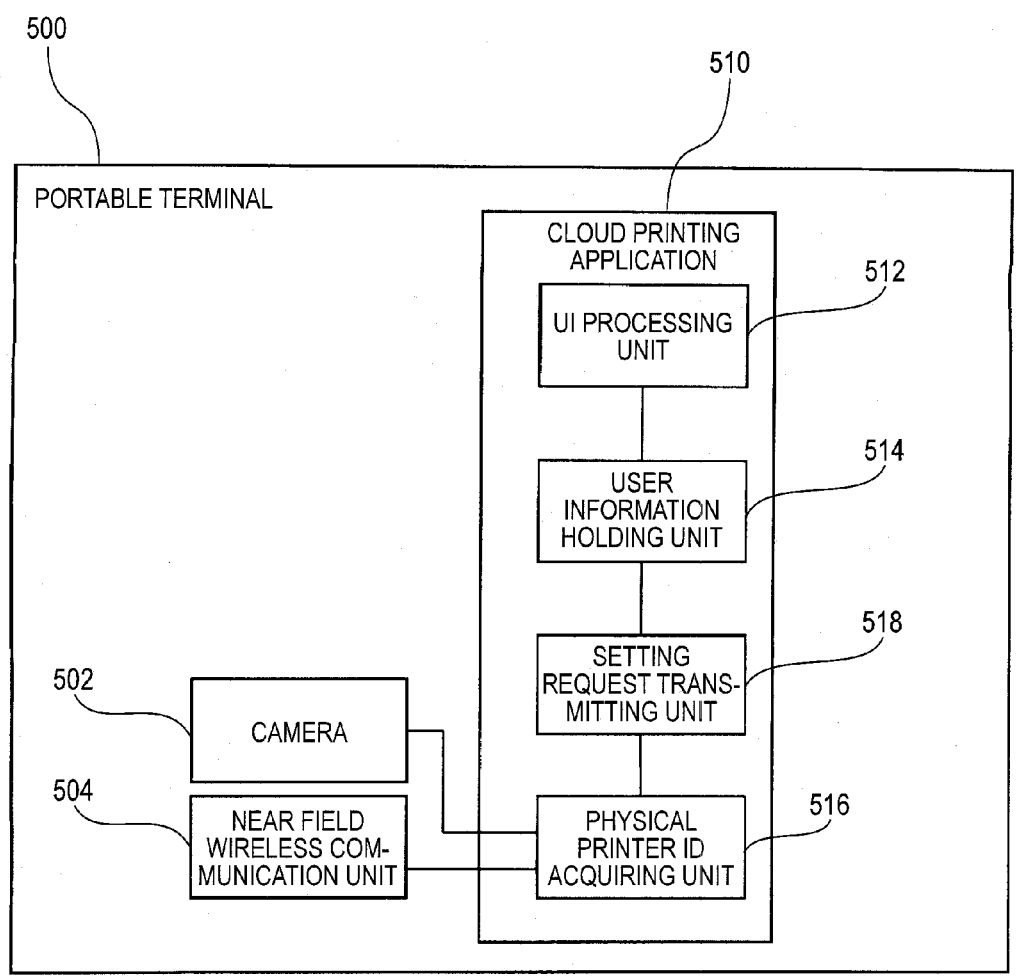
FIG. 4 shows an example functional configuration of a portable terminal according to the first exemplary embodiment.

Next, an example functional configuration of the portable terminal 500 which executes the above-described process will be described with reference to FIG. 4. It is noted that FIG. 4 shows only units that deeply relate to the process according to the exemplary embodiment and even common constituent elements of portable terminals are omitted if they are not very relevant to the process according to the exemplary embodiment.

A cloud printing application 510 is installed in the portable terminal 500. The cloud printing application 510 is an application which is used for performing printing from the portable terminal 500 using the cloud printing service 200. A UI processing unit 512 of the cloud printing application 510 provides a user interface for cloud printing. A user information holding unit 514 holds account information (user ID etc.) in the cloud printing service 200 of the user who carries the portable terminal 500. The account information is set by the user in advance. Instead of the cloud printing application 510, the OS of the portable terminal 500 may manage the account information.

A physical printer ID acquiring unit 516 and a setting request transmitting unit 518 are units that are in charge of the above-described provisional printer setting function. The physical printer ID acquiring unit 516 acquires the physical printer ID of the image forming apparatus 100 which is stuck with the label bearing the image code 120. The physical printer ID acquiring unit 516 also serves to acquire the physical printer ID of the image forming apparatus 100 from data that is obtained from the image forming apparatus 100 by a near field wireless communication unit 504 by an NFC communication. When the physical printer ID acquiring unit 516 acquires the physical printer ID of the image forming apparatus 100, the setting request transmitting unit 518 transmits, to the cloud printing service 200, a setting request that contains the acquired physical printer ID and the user account information held by the user information holding unit 514. Although in this example the means that uses near field communication and the means that analyzes an image of the physical printer ID are provided as the means for detecting the physical printer ID of the image forming apparatus 100, this is just an example. The physical printer ID acquiring unit 516 may be provided with only one of them or another kind of means.

In the portable terminal 500, upon activation, the cloud printing application 510 accesses the cloud printing service 200 on the Internet 400 over a cell phone network, a wireless network, or the like and logs in to the cloud printing service 200 using the account information held by the user information holding unit 514. The UI processing unit 512 displays a picture of a list of logical printers 210 of the user and other information that are supplied from the cloud printing service 200 after the login, and causes the user to select a logical printer 210 to be used from the list. The UI processing unit 512 generates, in addition to the logical printer selection picture, other UI pictures such as an output destination physical printer selection picture, a print setting picture, and a print subject document selection picture according to information supplied from, for example, the cloud printing service 200, the cloud repository service 300, and a file system in the portable terminal 500.

If the "provisional printer setting" function is selected from a manipulation menu, the UI processing unit 512 renders a camera 502 or the near field wireless communication unit 504 or both to establish a state that it can acquire a physical printer ID. In this state, the user shoots the image code 120 of the image forming apparatus 100 with the camera 502 or brings the portable terminal 500 close to the reader/writer unit of the image forming apparatus 100, the physical printer ID acquiring unit 516 acquires the physical printer ID from an image taken or a signal of a near field communication. Instead of the above operation in which the user explicitly selects the "provisional printer setting" function, when the image forming apparatus 100 which is compatible with the provisional printer setting function is detected by short-range communication such as NFC, the portable terminal 500 may activate the provisional printer setting function and cause the provisional printer setting function to acquire the physical printer ID from the image forming apparatus 100.

When the physical printer ID is acquired in the above-described manner, the setting request transmitting unit 518 transmits, to the cloud printing service 200, a setting request that contains the acquired physical printer ID and the user account information held by the user information holding unit 514. As a result, information (e.g., the ID of the user who is registered as the manager of a new logical printer 210 having such a setting or added as a sharer of an existing logical printer 210 of the manager of the image forming apparatus 100) that permits the user having that account to use the image forming apparatus 100 which corresponds to the physical printer ID is registered in the cloud printing service 200.

Next, a first modification will be described. In this modification, the cloud printing service 200 sets an expiration date and time for setting information (i.e., setting information for permitting the user of the portable terminal 500 to use the image forming apparatus 100) that has been set in response to a setting request transmitted from the portable terminal 500 (step (2) in FIG. 2). Until passage of the expiration date and time, according to the setting information the cloud printing service 200 accepts a print instruction of the user that has the image forming apparatus 100 as an output destination. After passage of the expiration date and time, the cloud printing service 200 invalidates the setting information and no longer accepts a print instruction of the user that has the image forming apparatus 100 as an output destination.

Figure 5:
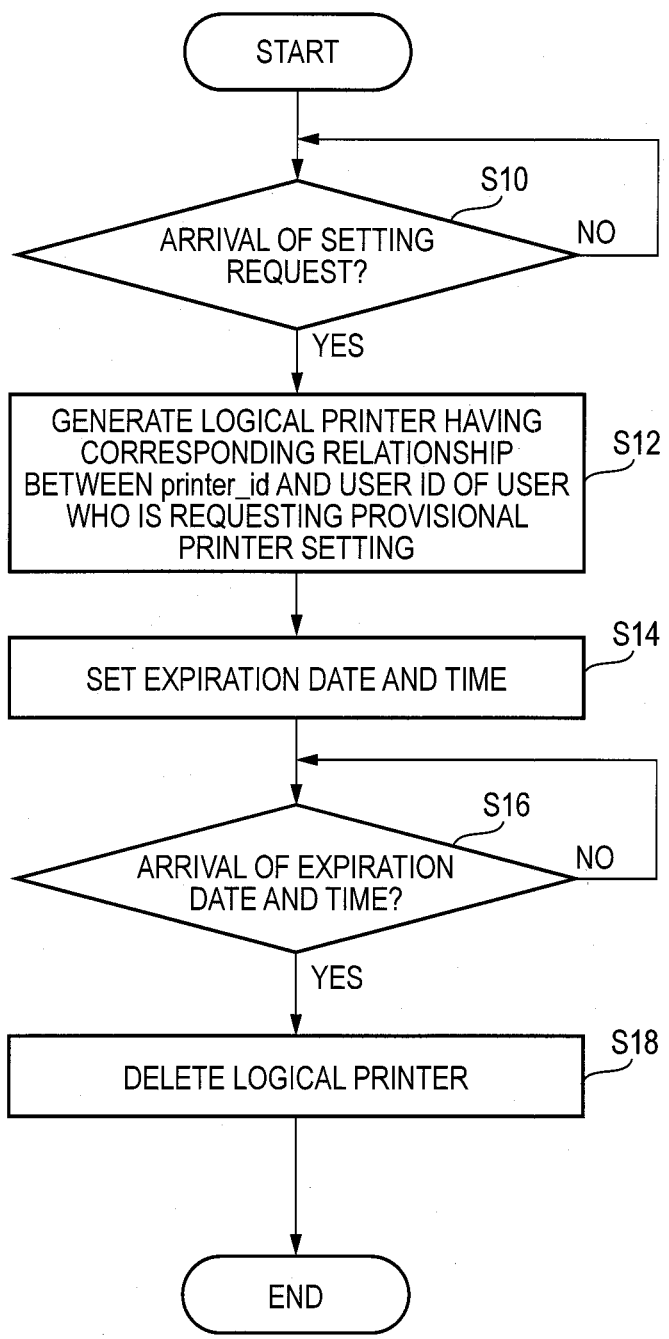
FIG. 5 shows an example process which is executed by a cloud printing service in a first modification of the first exemplary embodiment.

FIG. 5 shows an example process which is executed by the cloud printing service 200 and serves to permit the user of the portable terminal 500 to use the image forming apparatus 100. The respective processes that are executed by the image forming apparatus 100 and the portable terminal 500 may remain the same as described above with reference to FIGS. 1-4.

In the process shown in FIG. 5, at step S10, the cloud printing service 200 waits for transmission from the portable terminal 500 of a setting request containing the physical printer ID ("printer_id") of the image forming apparatus 100 and the user ID of the user of the portable terminal 500. Upon arrival of a setting request, at step S12 the cloud printing service 200 generates a new logical printer 210 corresponding to the user ID of the user who is requesting a provisional printer setting and sets, in the new logical printer 210, the physical printer ID of the subject physical printer as setting information indicating an output destination physical printer. At step S14, the cloud printing service 200 sets an expiration date and time for the logical printer 210 that was generated at step S12. For example, the cloud printing service 200 sets an expiration date and time that is a time of reception of the setting request plus a predetermined effective period. An alternative procedure is possible in which the portable terminal 500 receives a user input an expiration date and time or an effective period and transmits the received expiration date and time or the like to the cloud printing service 200 together with a setting request and the cloud printing service 200 sets an expiration date and time for the logical printer 210 on the basis of the received expiration date and time or the like.

There are no limitations on the manner of management of the expiration date and time. For example, a value of the expiration date and time may be held by the logical printer 210 as one piece of attribute information or registered in an expiration date and time management table provided outside the logical printer 210 so as to be correlated with the identification information of the logical printer 210.

At step S16, the cloud printing service 200 checks whether the expiration date and time of each logical printer 210 has arrived or not (on a regular basis, for example). If the expiration date and time of a certain logical printer 210 has arrived, at step S18 the cloud printing service 200 deletes that logical printer 210.

The logical printer 210 that was generated at step S12 can be used by the user having the user ID acquired at step S10 until it is deleted at step S18. During that period, using the logical printer 210, the user can produce a print output from the image forming apparatus 100 via the logical printer 210. After passage of the expiration date and time, the user cannot produce a print output from the image forming apparatus 100 because the logical printer 210 disappears, that is, the setting information meaning that the user is permitted to use the image forming apparatus 100 disappears from the cloud printing service 200. As such, this mechanism makes it possible to permit the user of the portable terminal 500 to use the image forming apparatus 100 temporarily. The manager of the image forming apparatus 100 need not explicitly cancel a setting for permitting the user of the portable terminal 500 to use the image forming apparatus 100.

A list of logical printers 210 (that can be used by the user) that is supplied from the cloud printing service 200 to the device (e.g., portable terminal 500) manipulated by the user may have expiration information (an expiration date and time or a remaining time to an expiration date and time) of each logical printer 210. When viewing this list, the user can recognize a logical printer 210 corresponding to the physical printer that has been made usable by the provisional printer setting function on the basis of presence/absence of an expiration date and time.

In the process of FIG. 5, a new logical printer 210 of the user of the portable terminal 500 is generated in which the image forming apparatus 100 is set as an output destination. Therefore, the logical printer 210 can be deleted upon arrival of the expiration date and time. In contrast, in the method in which the user is set as a sharer in a logical printer 210, already present in the cloud printing service 200, of the manager of the image forming apparatus 100 or the image forming apparatus 100 is added as an output destination in an existing logical printer 210 of the user, the logical printer 210 cannot be deleted even if the expiration date and time arrives. In this case, an appropriate measure is to delete the setting for permitting the user of the portable terminal 500 to use the image forming apparatus 100 from the logical printer 210 upon arrival of the expiration date and time. For example, when the user ID of the user of the portable terminal 500 is set as that of a sharer of a logical printer 210 of the manager of the image forming apparatus 100, the cloud printing service 200 sets an expiration date and time for the setting. And the cloud printing service 200 deletes the setting upon arrival of the expiration date and time. Likewise, when the physical printer ID of the image forming apparatus 100 is added as that of an output destination, the cloud printing service 200 sets an expiration date and time for the setting of the addition of the output destination in the logical printer 210. And the cloud printing service 200 deletes the addition setting upon arrival of the expiration date and time.

Instead of deleting a logical printer 210 or setting information upon arrival of an expiration date and time, a control may be made so as not to permit access of the user to the logical printer 210 even if it occurs if the expiration date and time is passed.

In the above-described first modification, setting information for permitting the user of the portable terminal 500 to use the image forming apparatus 100 is invalidated if the expiration date and time corresponding to the setting information arrives. The event that triggers invalidation of setting information is not limited to arrival of an expiration date and time. For example, if setting information is generated by the cloud printing service 200 and then printing by the image forming apparatus 100 that is based on a print instruction from the user is completed, the cloud printing service 200 may invalidate the setting information. Proper means may be provided so that setting information can be invalidated in response to an explicit user instruction. Invalidation of setting information may be realized by deleting it or adding, to setting information, information to the effect that it is invalid so that the cloud printing service 200 does not use the setting information added with that information.

Next, a second modification will be described. In this modification, when generating setting information for permitting the user of the portable terminal 500 to use the image forming apparatus 100 in response to a setting request from the cloud printing application 510 (step (2) in FIG. 2), the cloud printing service 200 locks the image forming apparatus 100, that is, makes it an apparatus dedicated to the user.

That is, after the generation of the setting information, users other than the user of the portable terminal 500 are prohibited from causing the image forming apparatus 100 to produce a print output via the cloud printing service 200 until a predetermined condition is satisfied. The predetermined condition that defines the end of the lock period may be passage of an expiration date and time (see the first modification). Alternatively, the predetermined condition may be completion of printing that is performed by the image forming apparatus 100 in response to a print instruction from the user after generation of the setting information. As a further alternative, the predetermined condition may be input of an explicit unlocking instruction from the user.

Figure 6:
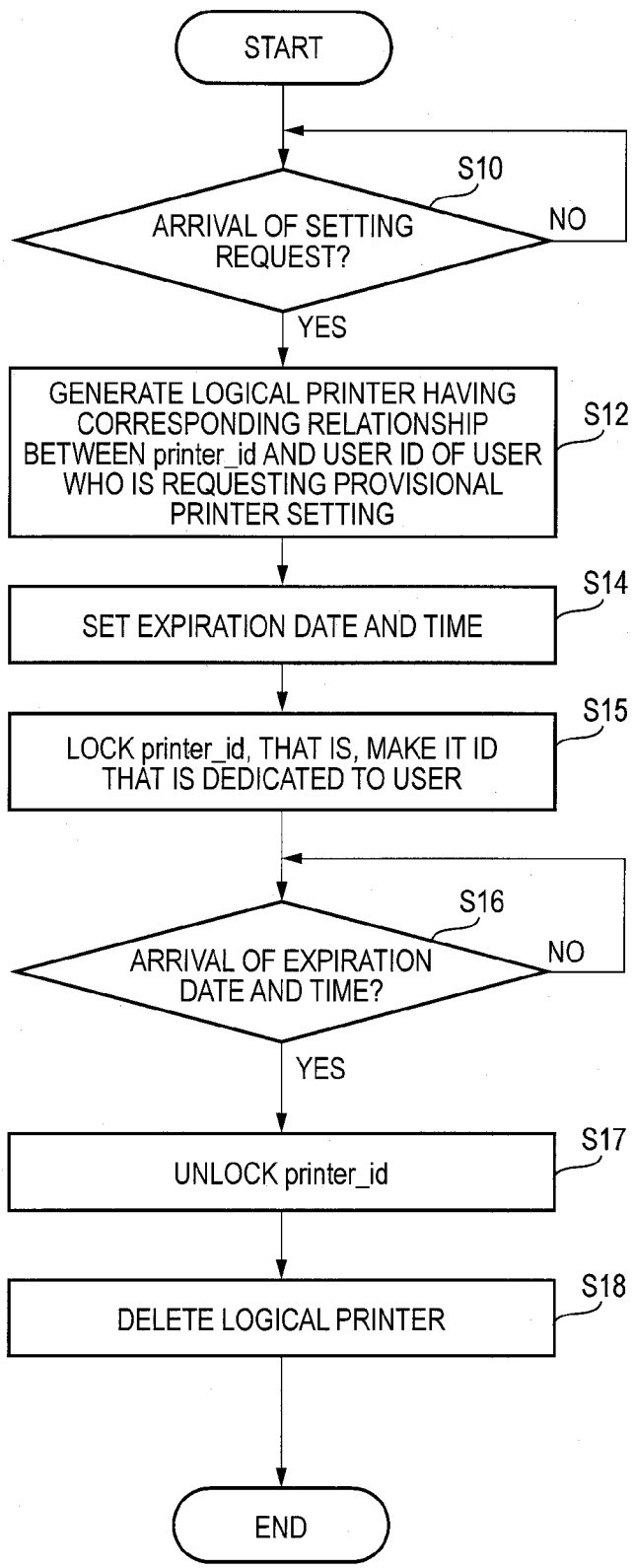
FIG. 6 shows an example locking/unlocking process which is executed by a cloud printing service in a second modification of the first exemplary embodiment.

FIG. 6 shows an example locking/unlocking process which is executed by the cloud printing service 200 in the second modification. This example process is of the case that the image forming apparatus 100 is unlocked upon passage of an expiration date and time. In the process of FIG. 6, steps having the same ones in FIG. 5 are given the same reference symbols as the latter. And descriptions therefor will be omitted.

In the process of FIG. 6, after preparation of a logical printer 210 at step S12 in response to arrival of a setting request (step S10), an expiration date and time is set for the logical printer 210 at step S12. At step S15, the physical printer ID ("printer_id") contained in the setting request is locked, that is, it is made an ID that is dedicated to the user ID contained in the setting request. For example, this is done by registering, in a locking management table held by the cloud printing service 200, an entry that contains the physical printer ID, the user ID, and the expiration date and time that was set at step S12. Upon arrival of the expiration date and time, the physical printer ID is unlocked at step S17. The logical printer 210 is deleted at step S18. For example, the physical printer ID may be unlocked by deleting the entry in which the expiration date and time has been passed from the locking management table.

Figure 7:
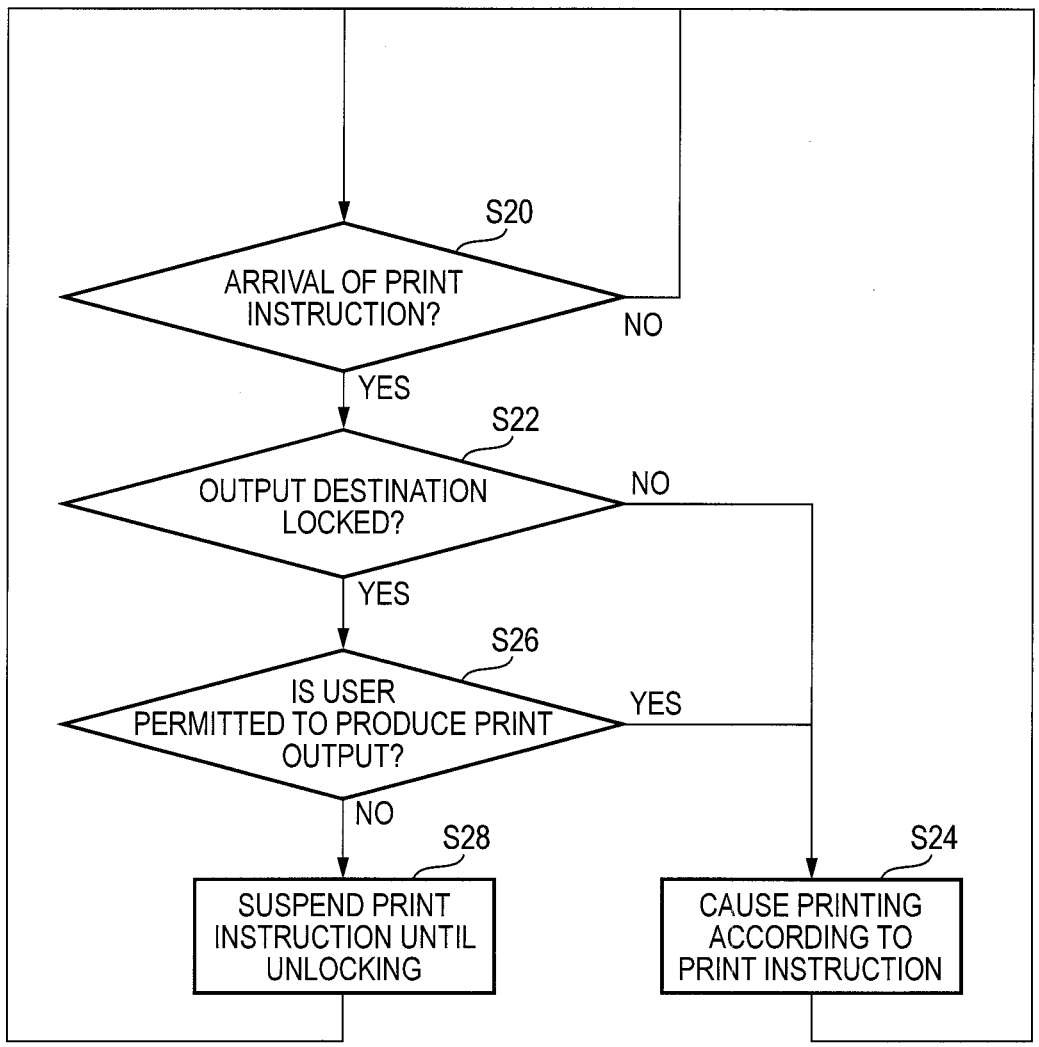
FIG. 7 shows an example process according to which the cloud printing service accepts or does not accept a print instruction from a user in the second modification.

FIG. 7 shows an example process according to which the cloud printing service 200 accepts or does not accept a print instruction from the user in the second modification.

In the process of FIG. 7, at step S20, the cloud printing service 200 waits for arrival of a print instruction from some user. Upon arrival of a print instruction, it is judged at step S22 whether the physical printer ID of the output destination that is designated in the print instruction is locked or not by referring to a lock management table (not shown). If the physical printer ID of the output destination is not locked, at step S24 print data is supplied to the image forming apparatus 100 corresponding to the physical printer ID of the output destination according to the print instruction so that printing is performed (see steps (4)-(6) in FIG. 2). If it is judged at step S22 that the physical printer ID of the output destination is locked, then it is judged at step S26 whether or not the user who issued the print instruction is a user who is permitted to produce a print output from the image forming apparatus 100 having the physical printer ID of the output destination. It is judged that the user who issued the print instruction is a user who is permitted to produce a print output from the image forming apparatus 100 (S26: yes) if the user ID of the user who issued the print instruction coincides with the user ID that is contained in the entry, corresponding to the physical printer ID of the output destination, of the locking management table. In this case, at step S24 the cloud printing service 200 causes printing according to the print instruction. If the judgment result of step S26 is negative, at step S28 the cloud printing service 200 stores the print instruction, that is, renders it in a suspended state. The cloud printing service 200 checks (on a regular basis, for example) whether the physical printer ID of the output destination contained in each suspended print instruction has been unlocked or not. If detecting an unlocked physical printer ID, the cloud printing service 200 causes printing according to the print instruction. It is noted that either of steps S22 and S26 may be executed first.

Although in the process of FIG. 7 a print instruction issued by another user and having the image forming apparatus 100 being locked as an output destination is rendered in a suspended state, this is just an example. Instead of rendering a print instruction from another user in a suspended state, acceptance of a print instruction issued by another user and having the image forming apparatus 100 being locked as an output destination may be prohibited.

If the locking is not canceled even after a print job of the user who locked the image forming apparatus 100 has been completed and the user has left the image forming apparatus 100, other users cannot use the image forming apparatus 100 until it is unlocked due to arrival of an expiration date and time or the like, which is inefficient. This problem may be solved in the following manner. If the cloud printing service 200 receives a setting request for a new provisional printer setting after transmitting print data of the user who locked the image forming apparatus 100 to the image forming apparatus 100 and receiving a notice of completion of printing of the print data from the image forming apparatus 100, the cloud printing service 200 unlocks the image forming apparatus 100 automatically and accepts the setting request. With this measure, another user can use the image forming apparatus 100 even if the image forming apparatus 100 is kept locked after the user who locked the image forming apparatus 100 left the image forming apparatus 100 with a produced print output. In this case, the cloud printing service 200 abstains from accepting a new setting request during a period from locking of the image forming apparatus 100 to completion of printing of the user who locked the image forming apparatus 100.

Next, a third modification will be described. This modification provides a mechanism for restricting the person who can temporarily use the image forming apparatus 100 via the cloud printing service 200 to the user of the portable terminal 500 who acquired the physical printer ID of the image forming apparatus 100 by short-range non-contact communication such as NFC.

Figure 8:
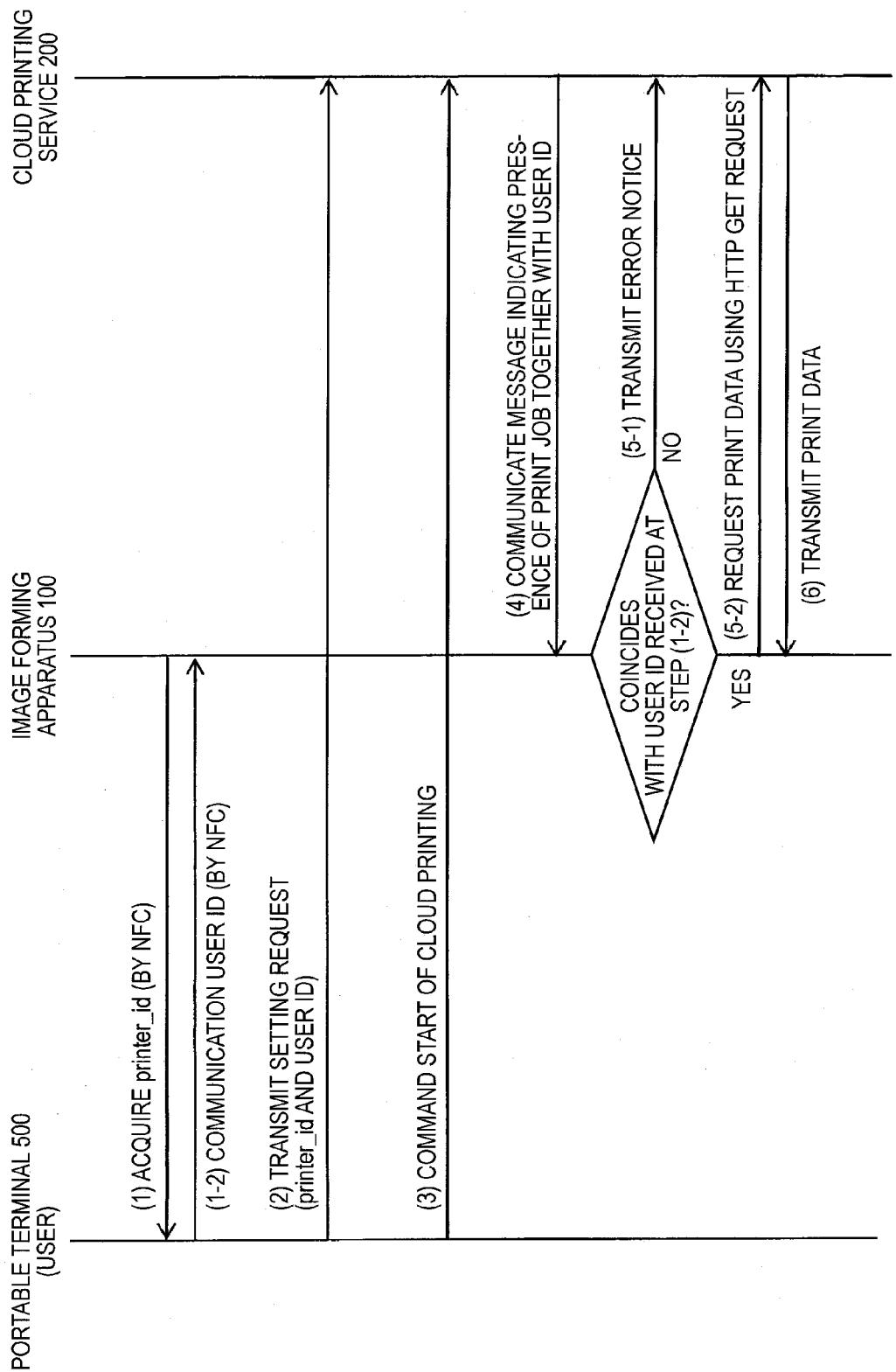
FIG. 8 shows a flow of a process executed in a third modification of the first exemplary embodiment.

FIG. 8 shows a flow of an example process executed in the third modification. Steps in FIG. 8 having the same ones in FIG. 2 are given the same reference symbols as the latter, and descriptions therefor will be omitted.

This modification is possible in the case where both of the image forming apparatus 100 and the portable terminal 500 is equipped with a communication means such as NFC which enables bidirectional communication of information.

In this process, when the user brings the portable terminal 500 close to the image forming apparatus 100, at step (1) the physical printer ID ("printer_id") is communicated from the image forming apparatus 100 to the portable terminal 500. Furthermore, at step (1-2), the user ID in the cloud printing service 200 of the user of the portable terminal 500 is communicated from the portable terminal 500 to the image forming apparatus 100. The image forming apparatus 100 stores the received user ID, and the stored user ID serves as what is called reservation information meaning that the image forming apparatus 100 will be used by the user having that user ID. The steps (2) and (3) that follow step (2-1) are the same as in the process of FIG. 2.

In this modification, when the cloud printing service 200 informs the image forming apparatus 100 of presence of a print job having the image forming apparatus 100 as an output destination at step (4) in response to the print instruction received at step (3), the cloud printing service 200 also transmits the user ID of the user who issued the print instruction. When receiving this notice, the image forming apparatus 100 judges whether the user ID received at step (4) coincides with the user ID that was communicated from the portable terminal 500 at step (1-2) and stored therein. If coincidence is not found, at step (5-1) the image forming apparatus 100 transmits an error notice to the effect that it cannot accept the print job. Receiving the error notice, the cloud printing service 200 abstains from transmitting print data to the image forming apparatus 100 and informs the user who issued the print instruction that he or she is not permitted to produce a print output from the image forming apparatus 100. If coincidence is found, at step (5-2) the image forming apparatus 100 requests the cloud printing service 200 to transmit print data, using a GET request of HTTP. In response to the request, at step (6) the cloud printing service 200 transmits print data to the image forming apparatus 100. The image forming apparatus 100 receives the print data and prints it on sheets.

In this example, the image forming apparatus 100 knows the user ID (in the cloud printing service 200) of the user who issued the print instruction for the print data, the image forming apparatus 100 may record the user ID in log (processing history) information of this printing as information of the user who commanded the printing.

In the case of a method in which print data is transmitted from the cloud printing service 200 to the image forming apparatus 100 by a push method without transmission of an XMPP message or the like (step (4)), the user ID may be transmitted to the image forming apparatus 100 together with the print data. The image forming apparatus 100 prints the print data if the thus-received user ID coincides with the user ID that was communicated from the portable terminal 500 at step (1-2), and does not print the print data if not.

Next, a fourth modification will be described with reference to FIG. 9.

The fourth modification makes it possible to produce a print output of a document from the image forming apparatus 100 via the cloud printing service 200 by bringing the portable terminal 500 being in a state that the document is opened and displayed close to the reader/writer unit of the image forming apparatus 100. In each of the above examples, a provisional printer setting is made with the image forming apparatus 100 as an output destination and then a print subject document is selected from the cloud repository service 300 or the like. In contrast, in this modification, a document being browsed or edited by the user on the portable terminal 500 is made a print subject automatically, whereby a document selecting manipulation can be omitted.

Assume a situation that the user has opened a document on the portable terminal 500 using an application (e.g., document edit application) having a function of displaying a document that can be a print subject and is browsing or editing the document displayed on the screen. At step (A) shown in FIG. 9, the user brings the portable terminal 500 being in such a state close to the reader/writer unit of the image forming apparatus 100. In response, at step (B), the image forming apparatus 100 detects the portable terminal 500 and transmits a selection picture for determination as to whether to perform printing to the portable terminal 500 by NFC. In response, the portable terminal 500 displays the received selection picture and the user inputs a selection instruction through the selection picture. The thus-input selection instruction of the user is transmitted from the portable terminal 500 to the image forming apparatus 100 by NFC.

If the selection instruction is "printing should be performed," the image forming apparatus 100 performs nothing and finishes the current process involving NFC communications.

If the selection instruction is "printing need not be performed," the portable terminal 500 activates the provisional printer setting function and, at step (C), communicates the selection instruction to the image forming apparatus 100 by NFC.

Receiving this notice, at step (1) the image forming apparatus 100 transmits its own physical printer ID ("printer_id") to the portable terminal 500 by NFC. At step (2), the provisional printer setting function of the portable terminal 500 makes a setting for permitting the user to use the image forming apparatus 100 by transmitting a setting request containing the received physical printer ID and the user ID of the user of the portable terminal 500 to the cloud printing service 200. Upon completion of this setting, the cloud printing service 200 informs the portable terminal 500 of the completion of the setting.

At step (3-1), receiving the notice of the completion of the setting, the portable terminal 500 accesses the cloud printing service 200 to command a start of printing with the document being opened by the above-mentioned application designated as a print subject. The portable terminal 500 may do so by transmitting, to the cloud printing service 200, either identification information such as a URL of the document or data itself of the document. For example, where the document being opened by the application is a document stored in the cloud repository service 300, the portable terminal 500 acquires identification information such as a URL of the document from the cloud repository service 300 and communicates the identification information to the cloud printing service 200. If the document is being edited on the application, the URL of the document may be communicated to the cloud printing service 200 after the document in the current form is stored in the cloud repository service 300. If the application is displaying a document that is stored in the file system of the portable terminal 500, data of the document may be transmitted to the cloud printing service 200 in such a manner as to be correlated with a print instruction.

Figure 9:
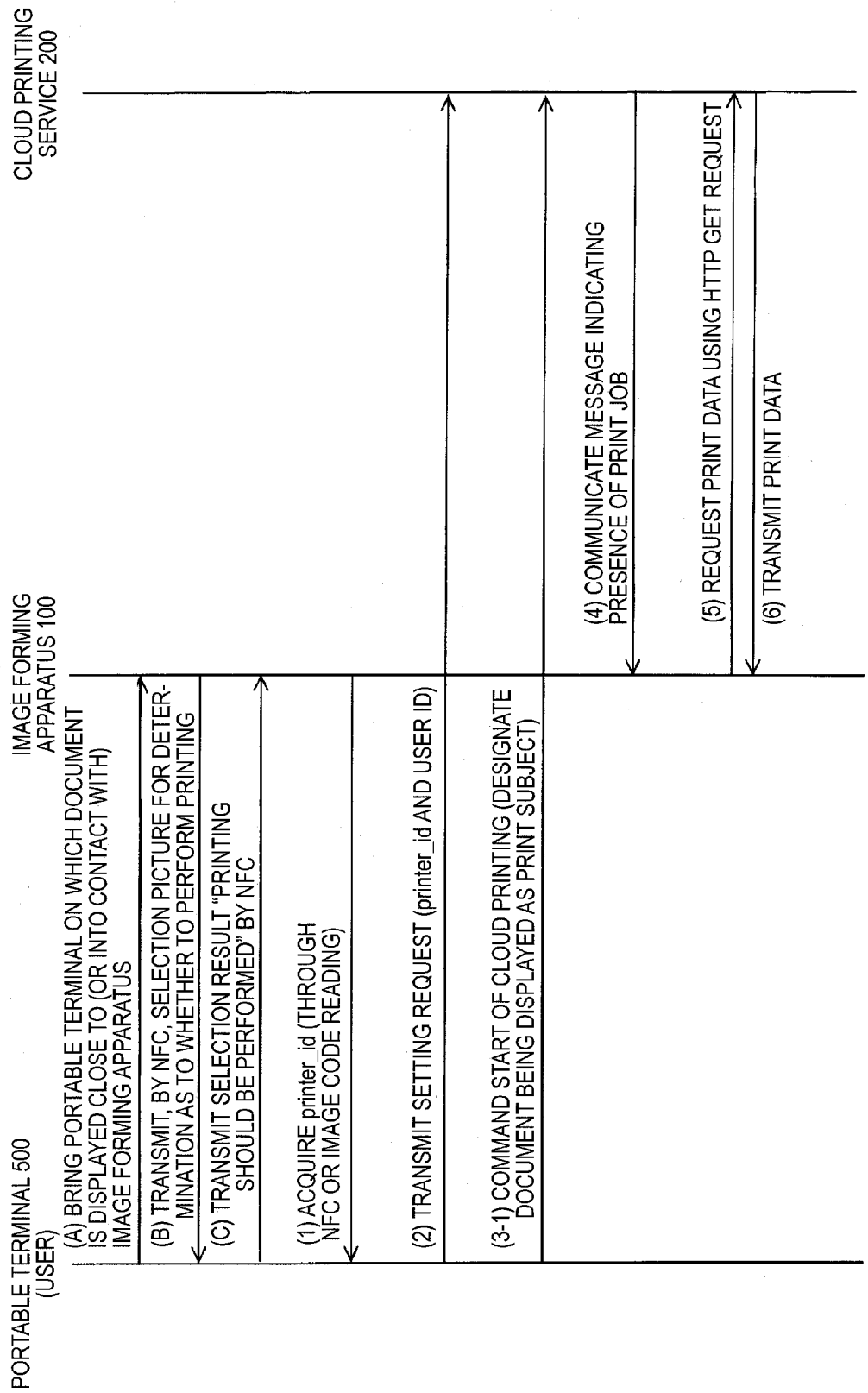
FIG. 9 shows a flow of a process executed in a fourth modification of the first exemplary embodiment.

The cloud printing service 200 generates print data of the document according to the print instruction and supplies the print data to the image forming apparatus 100 according to steps (4)-(6) shown in FIG. 9. Steps (4)-(6) shown in FIG. 9 may be the same as those shown in FIG. 2.

In the process of FIG. 9, at step (B) (i.e., after step (A)), the image forming apparatus 100 supplies a selection picture for determination as to whether to perform printing to the portable terminal 500 to have the user confirm that printing should be performed. However, this confirmation step may be omitted. In a process in which the confirmation step is omitted, when the portable terminal 500 on which a document is displayed by the user as a result of execution of step (A) is brought close to the image forming apparatus 100, the image forming apparatus 100 executes step (1), that is, transmits the physical printer ID to the portable terminal 500, using the bringing of the portable terminal 500 close to the image forming apparatus 100 as a trigger.

For example, the information processing units of the above-exemplified image forming apparatus 100, cloud printing service 200, and portable terminal 500 are realized by causing a general-purpose computer to run programs that represent processes to be executed by their individual function modules. For example, the term "computer" as used herein means a computer having a circuit configuration (hardware) that a microprocessor such as a CPU, memories (for primary storage) such as a random access memory (RAM) and a read-only memory (ROM), a secondary storage controller for controlling a secondary storage device such as an HDD (hard disk drive), an SSD (solid-state drive), or a flash memory, various I/O (input/output) interfaces, a network interface which performs a control for connection to a wireless or wired network, and other devices are connected to each other by, for example, a bus. A disc drive for reading from and/or writing to a portable disc recording medium such as a CD, a DVD, or a Blu-ray disc, a memory reader/writer for reading from and/or writing to any of various kinds of portable, nonvolatile recording media such as a flash memory, or a like device may be connected to the bus via an I/O interface, for example. The programs that represent the processes to be executed by the above-exemplified individual function modules are stored in the secondary storage device such as a flash memory via a recording medium such as a CD or a DVD or a communication means such as a network and installed in the computer. The above-exemplified function modules are realized when the programs stored in the secondary storage device are read into the RAM and run by the microprocessor such as a CPU.

Exemplary Embodiment 2

Ordinarily, such a setting as the provisional printer setting which enables use of a physical printer is made by the user's logging in to the cloud printing service 200. In contrast, in a second exemplary embodiment, the user changes what exercises his or her provisional printer setting authority from the portable terminal 500 to the image forming apparatus 100. The authority-transferred image forming apparatus 100 accesses the cloud printing service 200 on the received authority and thereby performs processing of making a setting for permitting the user to use the image forming apparatus 100.

The following example is directed to a case that an OAuth mechanism is used as an authority transfer means. OAuth is a protocol that provides a desktop computer, a portable terminal, a web application, or the like with a standard means for secure API (application programming interface) authorization. The use of OAuth is just an example, and another protocol capable of realizing similar authority transfer may be used.

In this exemplary embodiment, to make a print setting from the portable terminal 500, the portable terminal 500 is configured so as to be able to acquire capability information of the image forming apparatus 100 using short-range communication such as NFC (near field communication), Bluetooth (registered trademark), or WiFi. The capability information represents functions that can be provided by the image forming apparatus 100, residual amounts of sheets and inks, and other information, and the portable terminal 500 accepts a print setting from the user within the confines of the capability information.

Figure 10:
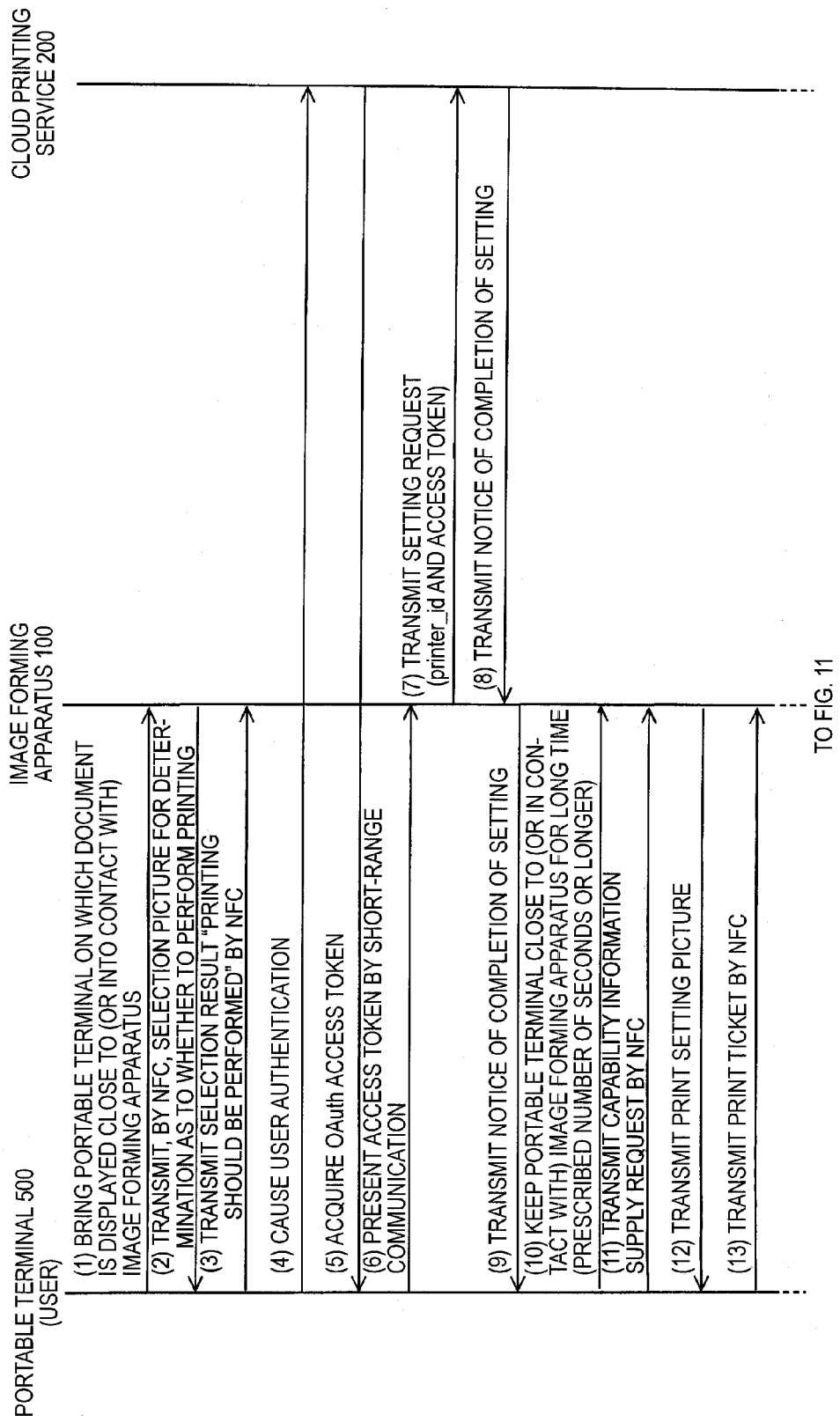
FIG. 10 shows a flow of a part of a process executed in a second exemplary embodiment.
Figure 11:
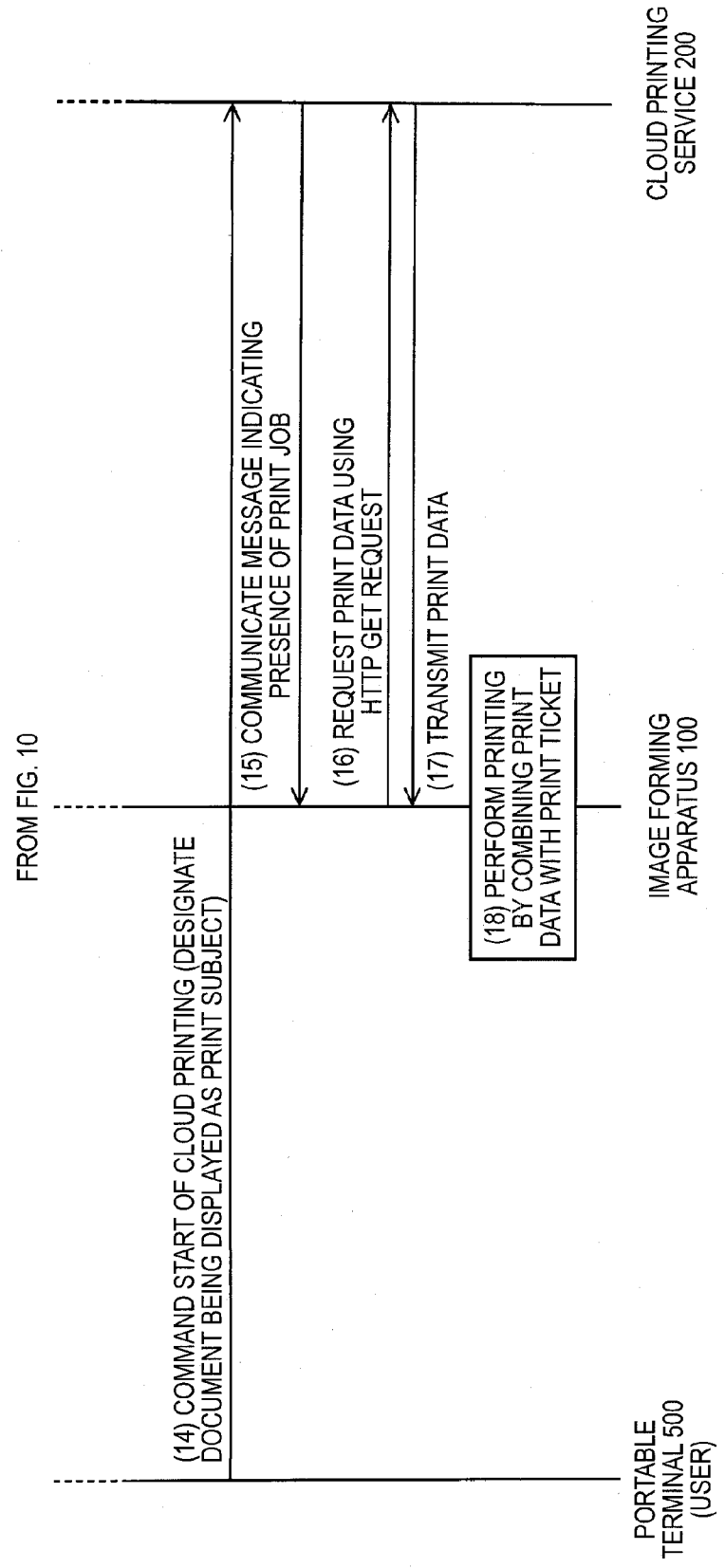
FIG. 11 shows a flow of the remaining part of the process executed in the second exemplary embodiment.

FIGS. 10 and 11 show a flow of a process that the portable terminal 500 causes the image forming apparatus 100 to produce a print output via the cloud printing service 200.

(1) The example of FIGS. 10 and 11 makes it possible to produce a print output from the image forming apparatus 100 via the cloud printing service 200 by the user's bringing the portable terminal 500 being in a state that the document is opened and displayed close to the NFC reader/writer unit of the image forming apparatus 100. Assume a situation that the user has opened a document on the portable terminal 500 using an application (e.g., document browsing application or document edit application) having a function of displaying a document that can be a print subject and is browsing or editing the document displayed on the screen. The process for printing is started by the user's bringing the portable terminal 500 being in this state close to (or into contact with) the reader/writer unit of the image forming apparatus 100.

(2) In response to the manipulation that the portable terminal 500 is brought close to (or into contact with) the image forming apparatus 100, the image forming apparatus 100 and the portable terminal 500 detect each other by a communication of the NFC standard. In response to the detection, the image forming apparatus 100 transmits a selection picture for determination as to whether to perform printing to the portable terminal 500 by NFC. More specifically, for example, when the user brings the portable terminal 500 close to (or into contact with) the reader/writer unit of the image forming apparatus 100, the image forming apparatus 100 transmits a notice indicating that the image forming apparatus 100 is a printer (or a printer that is made temporarily usable by the mechanism of this exemplary embodiment) to the portable terminal 500 by an NFC communication. Receiving the notice, the OS (operating system) of the portable terminal 500 activates a client printing application. And the client printing application acquires selection picture information that is transmitted from the image forming apparatus 100.

(3) The portable terminal 500 displays the received selection picture and the user inputs a selection instruction as to whether to perform printing through the selection picture. The thus-input selection instruction of the user is transmitted from the portable terminal 500 to the image forming apparatus 100 by NFC. FIG. 10 shows an example process that is executed when the user's selection instruction is "printing should be performed." If the user's selection instruction is "printing need not be performed," the image forming apparatus 100 performs nothing and finishes the current process involving NFC communications.

(4) If the selection instruction is "printing should be performed," a cloud printing application 510 (described later) of the portable terminal 500 is activated. The cloud printing application 510 accesses the cloud printing service 200 for user authentication. For example, this may be done in such a manner that the image forming apparatus 100 transmits, to the portable terminal 500, a response to the notice that was transmitted at step (3), the cloud printing application 510 is activated in response to the response, and user authentication processing is thereby performed.

In the user authentication processing, the cloud printing application 510 accesses the cloud printing service 200 causes the cloud printing service 200 to perform user authentication, using authentication information such as the user ID and a password of the user stored in the portable terminal 500. Instead of storing the user ID in the portable terminal 500, the cloud printing application 510 may cause the user to input the user ID in having user authentication performed.

(5) If the user authentication succeeds, the user makes various manipulations on the cloud printing service 200 from the cloud printing application 510. Thus, the user acquires an OAuth access token for transfer of the authority to make provisional printer setting manipulations.

For example, if the user selects a "provisional printer setting" manipulation from a manipulation menu of the cloud printing application 510, the cloud printing application 510 requests the cloud printing service 200 to issue an access token for transfer of the authority of the user to make a provisional printer setting. In response to the request, the cloud printing service 200 generates an access token. For example, the access token is a data value containing authorization information that prescribes details of authorization to be given to a person who present the access token. For example, the authorization information is information containing the user ID of the user in the cloud printing service 200 and information indicating an access right to access a provisional printer setting API provided by the cloud printing service 200. The access token may be a character string that is produced by, for example, coding the authorization information and appears a random one. Instead of including authorization information in an access token, it is possible to store authorization information added with identification information in the cloud printing service 200 and use, as an access token, the identification information that is added to the authorization information. In either method, when presented with an access token, the cloud printing service 200 can acquire the authorization information corresponding to the access token. An access token or authorization information may be managed by correlating it with an issuance date and time, an expiration date and time, or the like so that the access token is invalidated if a predetermined time has elapsed from the issuance date and time or the expiration date and time is passed.

The cloud printing service 200 returns the generated access token to the cloud printing application 510 as a response to the request.

(6) Acquiring the access token, the cloud printing application 510 transmits the access token to the image forming apparatus 100 by NFC. Although NFC is used in this example, short-range communications between the portable terminal 500 and the image forming apparatus 100 may be performed by any of other short-range wireless communication methods such as Bluetooth (registered trademark). A short-range communication method using a non-radio transmission medium, such as infrared communication, may be used.

Another example short-range communication method is a method in which the image forming apparatus 100 is equipped with a camera and an access token displayed on the screen of the portable terminal 500 is shot by the camera to transmit the access token to the image forming apparatus 100. In this case, no limitations are imposed on the form of display of an access token. For example, an access token may be displayed on the screen in the form of an image code such as a QR (registered trademark) code, a bar code, or a character string. The image forming apparatus 100 determines the value of the access token by analyzing an image taken using an analyzing algorithm that is suitable for the display form of the access token. This method and the methods using NFC, infrared communication, etc. have in common that the portable terminal 500 and the image forming apparatus 100 are associated with each other in such a manner that the user carrying the portable terminal 500 goes to the image forming apparatus 100 and brings the portable terminal 500 close to the image forming apparatus 100.

To transfer the access token from the portable terminal 500 to the image forming apparatus 100, after the acquisition of an access token as a result of execution of steps (4) and (5) the cloud printing application 510 may display, on the screen of the portable terminal 500, a guide picture for prompting the user to make a close-holding (or contact) manipulation again.

Although in this example a close-holding (or contact) manipulation is made two times, that is, at step (1) (the start of the process for printing) and at step (6) (transfer of an access token), these two steps may be executed during one close-holding (or contact) manipulation period.

(7) Receiving the access token, the image forming apparatus 100 generates a setting request containing the acquired access token and its own physical printer ID and transmits the generated setting request to the cloud printing service 200 over the Internet 400. The data format of a setting request determined by the cloud printing service 200 in advance, and the image forming apparatus 100 generates a setting request according to that data format.

Receiving the setting request from the image forming apparatus 100, the cloud printing service 200 makes a provisional printer setting (described above) according to the setting request. More specifically, the cloud printing service 200 takes out the access token from the setting request and acquires the authorization information corresponding to the access token. The authorization information contains the user ID and information to the effect that execution of the provisional printer setting function is authorized. Based on the acquired authorization information, the cloud printing service 200 recognizes that the image forming apparatus 100 which is the transmission source of the request has authority to make a provisional printer setting. Thus, the cloud printing service 200 registers, in itself, setting information that correlates the physical printer ID of the image forming apparatus 100 as the output destination contained in the setting request with the user ID included in the authorization information. In this example, as described above, a logical printer 210 having the setting information is prepared by generating a new logical printer 210 altering an existing logical printer 210.

With the above setting processing, the user who carries the portable terminal 500 is permitted to produce a print output from the image forming apparatus 100 via the cloud printing service 200.

(8) Upon completion of the setting processing, the cloud printing service 200 returns a notice of completion of the setting to the image forming apparatus 100 as a response to the setting request of step (7).

(9) Receiving the notice of completion of the setting, the image forming apparatus 100 informs the portable terminal 500 of the completion of the setting by an NFC communication. This notice may be transmitted as a response to the access token received at step (6). For example, proper measures may be taken so that steps (6)-(9) are executed during a period (started at step (6)) when the portable terminal 500 is close to (or in contact with) the reader/writer unit of the image forming apparatus 100. In this case, the user can be notified of the fact that he or she has been permitted to use the image forming apparatus 100 by displaying a message corresponding to this notice on the screen of the portable terminal 500.

With the above steps, it becomes possible to issue a print instruction in which the image forming apparatus 100 is designated as an output destination from the portable terminal 500 to the cloud printing service 200.

(10) To make a print setting, the user again brings the portable terminal 500 close to (or into contact with) the image forming apparatus 100. In this example, the portable terminal 500 is kept close to (or in contact with) the image forming apparatus 100 to make a print setting for a predetermined period (e.g., several seconds) or longer. This period is longer than the close-held (or contact) period for starting of a process for printing and the close-held period for transfer of an access token. To prompt the user to bring the portable terminal 500 close to (or into contact with) the image forming apparatus 100 to command making of a print setting, cloud printing application 510 of the portable terminal 500 may display a guide picture for making a print setting after step (3) or (9). For example, the guide picture may have such a message as "Keep the portable terminal close to (or in contact with) the reader/writer unit of the printer for 5 seconds or longer." To perform printing with a default print setting, the user may abstain from making such a long close-holding (or contact) manipulation (as a result, steps (11)-(13) (described below) will not be executed). Although in this example the user keeps the portable terminal 500 close to (or in contact with) the image forming apparatus 100 for the prescribed number of seconds or longer to command making of a print setting, this kind of manipulation is just an example.

(11) When the user has kept the portable terminal 500 close to (or in contact with) the image forming apparatus 100 for the prescribed number of seconds or longer to start print setting processing, the cloud printing application 510 detects it and transmits an capability information supply request to the image forming apparatus 100 by an NFC communication.

(12) Receiving the capability information supply request, the image forming apparatus 100 generates a print setting picture that reflects its own capability information and returns information representing the print setting picture to the portable terminal 500 by NFC. In the print setting picture, selectable options and settable parameter value ranges are restricted for respective print setting items according to the capability information of the image forming apparatus 100. For example, if the image forming apparatus 100 does not have a double-sided printing function, a GUI (graphical user interface) section for selection between single-sided printing and double-sided printing in the print setting picture is shown so as to disable selection of the double-sided printing option. A sheet selection section in the print setting picture is shown so as to enable selection among only the types of sheets held in the image forming apparatus 100. A number-of-copies specifying section may be shown so as to enable selection within a maximum number of copies that can be printed with a remaining number of sheets selected (since the number of pages of the document that was displayed at step (1) is known, a printable number of copies can be calculated if a remaining number of sheets becomes known). Instead of generating a print setting picture, the image forming apparatus 100 may merely transmit, to the portable terminal 500, its own capability information described according to rules that are set in the cloud printing service 200, to cause the cloud printing application 510 of the portable terminal 500 to generate a print setting picture on the basis of the received capability information.

(13) The cloud printing application 510 displays the print setting picture and receives, from the user, setting manipulations that are directed to the respective setting items in the print setting picture. If the user makes a setting finalizing manipulation such as a push of a GUI button for finalizing a print setting, the cloud printing application 510 generates data called a print ticket in which selection/input results for the respective setting items in the print setting picture are described according to the rules that are set in the cloud printing service 200. When, for example, the user again brings the portable terminal 500 close to the reader/writer unit of the image forming apparatus 100, the cloud printing application 510 transmits the print ticket to the image forming apparatus 100 by an NFC communication.

Instead of transmitting a print ticket when the portable terminal 500 is again brought close to (or into contact with) the reader/writer unit of the image forming apparatus 100, another method may be employed in which the user makes a print setting through the print setting picture displayed on the portable terminal 500 which is kept close to (or in contact with) the image forming apparatus 100 from step (10) and a print ticket is transmitted to the image forming apparatus 100 upon a push of the setting finalizing GUI button in the picture. Still another method is possible in which the cloud printing application 510 updates the print ticket every time a selection/input manipulation is made through the print setting picture and when the user brings the portable terminal 500 close to (or into contact with) the image forming apparatus 100 a print ticket at that time is transmitted to the image forming apparatus 100.

The cloud printing application 510 transmits, by NFC, the document identification information of the print subject document that was displayed on the screen at step (1) in such a manner that the document identification information is correlated with the print ticket. There are no limitations on the manner of correlating a print ticket and document identification information with each other. For example, an element representing the document identification information of a print subject document may be added in a print ticket that is described in XML (extensible markup language) or the like.

The image forming apparatus 100 stores the print ticket and the document identification information of the print subject document in such a manner that they are correlated with each other. If the document identification information is included in the print ticket, it suffices to merely store the print ticket.

The document identification information of a print subject document may be a URL which indicates a storage location of the document. Since a document which is stored in the cloud repository service 300, for example, was displayed at step (1), the portable terminal 500 knows the URL of the document. The process moves to the steps shown in FIG. 11.

(14) The portable terminal 500 accesses the cloud printing service 200, and instructs the cloud printing service 200 to perform printing with the document that was displayed on the screen at step (1) designated as a print subject. At this time, the portable terminal 500 transmits, to the cloud printing service 200, document identification information such as a URL which identifies the document. Alternatively, the portable terminal 500 may transmit data itself of the document.

If the document was being edited by a document edit application or the like at the time point of step (1), the URL of the document may be communicated to the cloud printing service 200 after the document is stored in the cloud repository service 300. If a document existing in the portable terminal 500 is being displayed by the application, data of the document may be transmitted to the cloud printing service 200 in such a manner as to be correlated with the print instruction. In this case, the portable terminal 500 may give document identification information to the document, include the document identification information in the print ticket, and add the document identification information to document data to be transmitted to the cloud printing service 200.

If plural logical printers 210 that can be used by the user (i.e., logical printers 210 in which the user is registered as a manager or a sharer) exist in the cloud printing service 200 when the cloud printing application 510 accesses the cloud printing service 200 to command printing (step (14)), for example, the cloud printing service 200 supplies a list of the usable logical printers 210 to the cloud printing application 510. The user selects the logical printer 210 corresponding to the image forming apparatus 100 to be used this time from the list.

If plural usable physical printers are set for the logical printer 210 that has been correlated with the image forming apparatus 100, a list of the physical printers is supplied from the logical printer 210 to the cloud printing application 510. The user selects a physical printer to be used as an output destination of this time from the list displayed by the cloud printing application 510. It is assumed here that the image forming apparatus 100 is selected as an output destination.

A list of logical printers 210 that is supplied from the cloud printing service 200 to the portable terminal 500 may include, for each logical printer 210, an owner (manager) name and a sharing status (e.g., shared/unshared or sharer names).

The cloud printing service 200 may hold discrimination information indicating whether each logical printer 210 that can be used by the user was generated by ordinary registration setting made by the user or has been generated by the provisional printer setting function according to the exemplary embodiment, and include the discrimination information in the list of logical printers 210 to be supplied to the portable terminal 500. In this case, when the list is displayed by the portable terminal 500, information indicating which of the two categories each logical printer 210 falls under is shown, which allows the user to more easily select the logical printer 210 corresponding to the image forming apparatus 100 for which the provisional printer setting has just been made.

In the case of the method in which in the provisional printer setting of step (7) the image forming apparatus 100 is added as an output destination candidate in an existing logical printer 210 of the user of the portable terminal 500, discrimination information indicating that the image forming apparatus 100 has been added by the provisional printer setting function may be set in the logical printer 210. Also in this case, information indicating the image forming apparatus 100 that has been registered by the user using the provisional printer setting function can be displayed in such a form as to be discriminated from pieces of information indicating image forming apparatus that were generated by the ordinary registration setting function when a list of logical printers 210 that can be used by the user is displayed on the portable terminal 500.

Furthermore, in this case, the cloud printing service 200 may give, to the information indicating the output destination candidate that has been additionally registered in the logical printer 210 by the provisional printer setting function, attribute information indicating that fact. This makes it possible to display the information indicating the physical printer (image forming apparatus 100) that has been set by the provisional printer setting function in a different display form than pieces of information indicating physical printers that were registered by ordinary registration processing when a list of output destination physical printers registered in the logical printer 210 is supplied to the portable terminal 500 and displayed thereon. Looking at this display, the user recognizes the image forming apparatus 100 he or she is going to use this time temporarily and selects it as an output destination.

In the case of the method in which the user ID of the user of the portable terminal 500 is registered as that of a sharer in the logical printer 210 of the manager of the image forming apparatus 100 when a provisional printer setting is made at step (7), the user ID of the user who has been registered as a sharer may be given attribute information indicating that the user ID has been registered by the provisional printer setting function. When a list of logical printers 210 that can be used by the user is supplied to the portable terminal 500 from the cloud printing service 200, if the list includes a logical printer 210 in which the user of the portable terminal 500 is included as a sharer and the user ID of the user is given attribute information indicating that it has been registered by the provisional printer setting function, the logical printer 210 can be displayed on the portable terminal 500 as one set by the provisional printer setting function in such a form as to be discriminated from logical printers 210 that were generated by the ordinary registration setting function.

The cloud printing service 200 may automatically selects the logical printer 210 corresponding to the physical printer ID of the image forming apparatus 100 by employing measures that the portable terminal 500 acquires its physical printer ID from the image forming apparatus 100 when, for example, the portable terminal 500 is first brought close to (or into contact with) the image forming apparatus 100 (step (1)) and that the cloud printing application 510 informs the cloud printing service 200 of the acquired physical printer ID in accessing the cloud printing service 200 (step (14)).

The cloud printing application 510 passes the document identification information of the document that was displayed at step (1) to the thus-selected logical printer 210, and instructs the logical printer 210 to produce a print output from the image forming apparatus 100.

Receiving the print instruction, the logical printer 210 acquires data of the designated print subject document from the portable terminal 500, the cloud repository service 300, or the like and converts the document data into a print data format. Instead of the logical printer 210's acquiring the print subject document on its own initiative, the portable terminal 500 may acquire the document from the cloud repository service 300 or the like and transmit it to the logical printer 210. A further alternative operation is possible in which the portable terminal 500 instructs the cloud repository service 300 to supply the print subject document stored therein to the cloud printing service 200 and the cloud repository service 300 transmits the document to the cloud printing service 200 in response to the instruction. If a document stored in the portable terminal 500 is designated as a print subject document, the portable terminal 500 transmits it to the cloud printing service 200.

Either of designation of a logical printer 210 to be used (and, if necessary, an output destination physical printer) and designation of a print subject document may be done first.

(15) Once print data of the designated document has been prepared, the logical printer 210 transmits a message containing information that identifies the print data (e.g., a URL (uniform resource locator) of the print data) to the image forming apparatus 100 which has been designated as the output destination. In the case of Google Cloud Print, this message is transmitted via the Google Talk service using XMPP (Extensible Messaging and Presence Protocol).

(16) Receiving the message, the image forming apparatus 100 requests the cloud printing service 200 to transmit the print data, using a GET request of HTTP. This request contains the information that is contained in the received message and identifies the print data. The request may also contain the physical printer ID of the image forming apparatus 100.

(17) In response to the request, the cloud printing service 200 transmits the print data of the document designated by the user at step (7) to the image forming apparatus 100. The print data is accompanied by the document identification information of the document (transmitted from the portable terminal 500 at step (14)).

(18) The image forming apparatus 100 receives the print data and prints it on sheets. The image forming apparatus 100 determines a print ticket corresponding to the document identification information that accompanies the print data among print tickets stored therein, and performs printing by applying the print setting represented by the determined print ticket to the print data.

After completion of the printing at step (18), the image forming apparatus 100 may inform the cloud printing service 200 of the completion of the printing and, in response, the cloud printing service 200 may inform the portable terminal 500 of the completion of the printing. At the same time as communicates the notice of completion of the printing, the cloud printing service 200 may inquire of the portable terminal 500 whether printing of another document is to follow. If in response to this inquiry the user returns an answer to the effect that no further document is to be printed, the cloud printing service 200 may delete the setting information for permitting the user to use the image forming apparatus 100.

Although in the process of FIG. 11 the image forming apparatus 100 requests the cloud printing service 200 to transmit the print data in response to the notice that was received from the cloud printing service 200 at step (15), this is just an example. Since the image forming apparatus 100 received, at step (13) shown in FIG. 10, the document identification information (e.g., URL) of the document to which the print ticket is to be applied, the image forming apparatus 100 may request the cloud printing service 200 to transmit print data of the document corresponding to the document identification information. In this case, the cloud printing service 200 need not transmit a notice to the image forming apparatus 100 at step (15).

Figure 12:
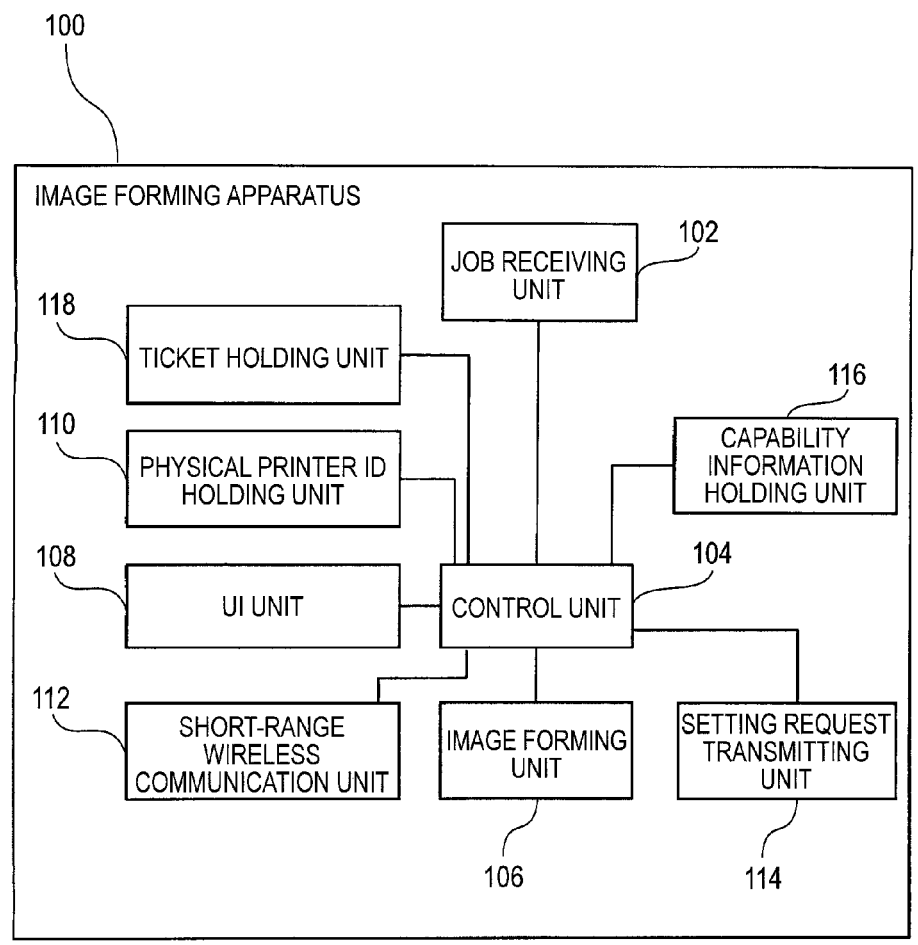
FIG. 12 shows an example functional configuration of an image forming apparatus according to the second exemplary embodiment.

Next, an example functional configuration of the image forming apparatus 100 which executes the above-described process will be described with reference to FIG. 12. It is noted that FIG. 12 shows only units that deeply relate to the process according to the exemplary embodiment and even common constituent elements of image forming apparatus are omitted if they are not very relevant to the process according to the exemplary embodiment.

In the image forming apparatus 100, a job receiving unit 102 receives am XMPP message or the like by communicating with the cloud printing service 200 and receives print data using an HTTP request which is a response to the message. An image forming unit 106 is a device for printing images on media such as sheets. A control unit 104 is a system for controlling the entire image forming apparatus 100. For example, the control unit 104 instructs an image processing unit (not shown) to convert print data received by the job receiving unit 102 from the cloud printing service 200 into image data of, for example, a raster format that can be handled by the image forming unit 106 and supplies the resulting image data to the image forming unit 106 to have the image data printed on media. Furthermore, when a manipulation for registering the image forming apparatus 100 in the cloud printing service 200 has been made, the control unit 104 stores a physical printer ID that is transmitted from the cloud printing service 200 in a physical printer ID holding unit 110.

A UI (user interface) unit 108 displays a picture through which to receive a user manipulation on the image forming apparatus 100 and receives a user manipulation through the displayed picture. A near field wireless communication unit 112 is a device for performing a communication according to the NFC standard. When the user brings the portable terminal 500 which is compatible with NFC close to the reader/writer unit of the image forming apparatus 100, the near field wireless communication unit 112 recognizes the NFC-compatible device (portable terminal 500). In response to this recognition, the control unit 104 supplies information indicating that the self apparatus is a printer and other information to the portable terminal 500 by an NFC communication. The near field wireless communication unit 112 is also used for a communication for receiving an access token or a print ticket from the portable terminal 500. A setting request transmitting unit 114 transmits, to the cloud printing service 200, a setting request that contains an access token received from the portable terminal 500 and a physical printer ID held by the physical printer ID 110. As a result, setting information (e.g., the ID, for example, of the user who has been registered in a new logical printer 210 having such a setting or added as a sharer in an existing logical printer 210 of the manager of the image forming apparatus 100) for permitting the user having the account concerned to use the image forming apparatus 100 corresponding to the physical printer ID is registered in the cloud printing service 200.

An capability information holding unit 116 holds capability information of the image forming apparatus 100. Among pieces of capability information held by the capability information holding unit 116, variable items such as a residual amount of sheets are updated to latest values by the control unit 104. When receiving an capability information supply request from the portable terminal 500, the control unit 104 supplies the capability information held by the capability information holding unit 116 (or print setting picture information generated on the basis of the capability information) to the portable terminal 500.

A ticket holding unit 118 holds a print ticket received from the portable terminal 500 in response to a close-holding (or contact) manipulation and document identification information of a print subject document in such a manner that they are correlated with each other. When the job receiving unit 102 receives print data from the cloud printing service 200, the control unit 104 searches the ticket holding unit 118 for a print ticket corresponding to the document identification information of the print data and applies the thus-found print ticket to the print data. The image forming unit 106 performs printing of the print data according to the print setting.

Figure 13:
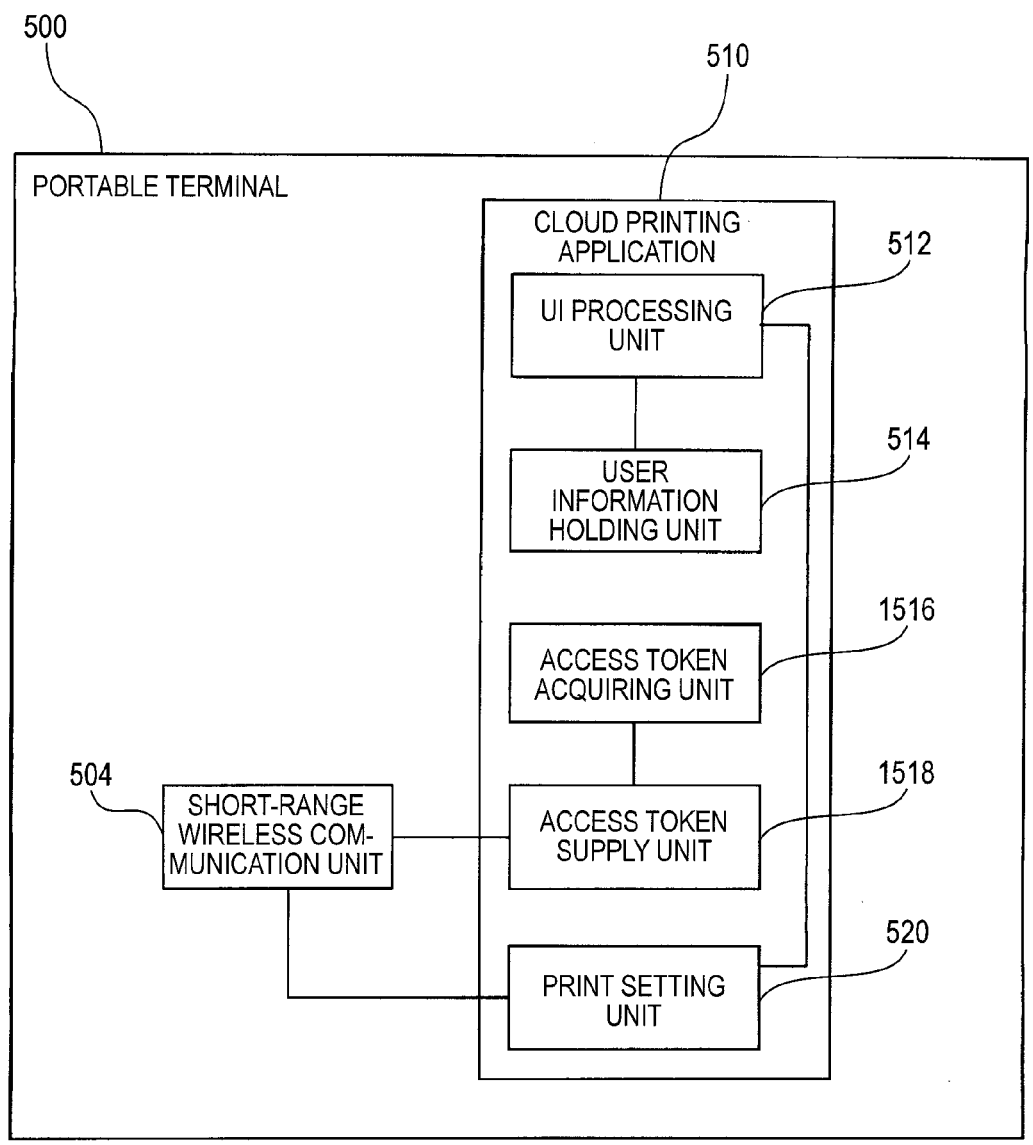
FIG. 13 shows an example functional configuration of a portable terminal according to the second exemplary embodiment.

Next, an example functional configuration of the portable terminal 500 which executes the above-described process will be described with reference to FIG. 13. It is noted that FIG. 13 shows only units that deeply relate to the process according to the exemplary embodiment and even common constituent elements of portable terminals are omitted if they are not very relevant to the process according to the exemplary embodiment.

The cloud printing application 510 is installed in the portable terminal 500. The cloud printing application 510 is an application which is used for performing printing from the portable terminal 500 using the cloud printing service 200. A UI processing unit 512 of the cloud printing application 510 provides a user interface for cloud printing. A user information holding unit 514 holds account information (user ID etc.) in the cloud printing service 200 of the user who carries the portable terminal 500. The account information is set by the user in advance. Instead of the cloud printing application 510, the OS of the portable terminal 500 may manage the account information.

An access token acquiring unit 1516 performs processing of acquiring an access token to be used for transfer of provisional printer setting authority from the cloud printing service 200 over the Internet 400. An access token supply unit 1518 supplies the access token acquired by the access token acquiring unit 1516 to the image forming apparatus 100 by short-range wireless communication such as NFC.

In the portable terminal 500, upon activation, the cloud printing application 510 accesses the cloud printing service 200 on the Internet 400 over a cell phone network, a wireless network, or the like and logs in to the cloud printing service 200 using the account information held by the user information holding unit 514. The UI processing unit 512 displays a picture of a list of logical printers 210 of the user and other information that are supplied from the cloud printing service 200 after the login, and causes the user to select a logical printer 210 to be used from the list. The UI processing unit 512 generates, in addition to the logical printer selection picture, other UI pictures such as an output destination physical printer selection picture, a print setting picture, and a print subject document selection picture according to information supplied from, for example, the cloud printing service 200, the cloud repository service 300, and a file system in the portable terminal 500.

If "provisional printer setting" is selected from a manipulation menu, the UI processing unit 512 instructs the access token acquiring unit 1516 to acquire an access token. In response, the access token acquiring unit 1516 requests the cloud printing service 200 (to which the cloud printing application 510 has logged in) to issue an access token for provisional printer setting and acquires an access token issued in response to the request. In this manner, instead of the user's explicitly commanding provisional printer setting, when the image forming apparatus 100 which is compatible with the provisional printer setting function is detected by short-range communication such as NFC, the access token acquiring unit 1516 is activated and performs access token acquisition processing.

When an access token is acquired in the above-described manner, the access token supply unit 1518 supplies the acquired access token to the image forming apparatus 100 through the short-range wireless communication unit 504 by NFC communication or the like. The access token supply unit 1518 may supply the access token to the image forming apparatus 100 only if it is confirmed by NFC communication or the like that the communication partner is the image forming apparatus 100 which is compatible with the provisional printer setting function according to the exemplary embodiment.

When detecting a long close-holding (or contact) manipulation at step (10) shown in FIG. 10, a print setting unit 520 acquires capability information by NFC or the like (through the short-range wireless communication unit 504). The print setting unit 520 displays a print setting picture that is based on the capability information on the display device of the portable terminal 500 via the UI processing unit 512, and receives setting manipulations from the user. The print setting unit 520 generates a print ticket representing a result of the setting manipulations and transmits the generated print ticket to the image forming apparatus 100 by NFC or the like.

Figure 14:
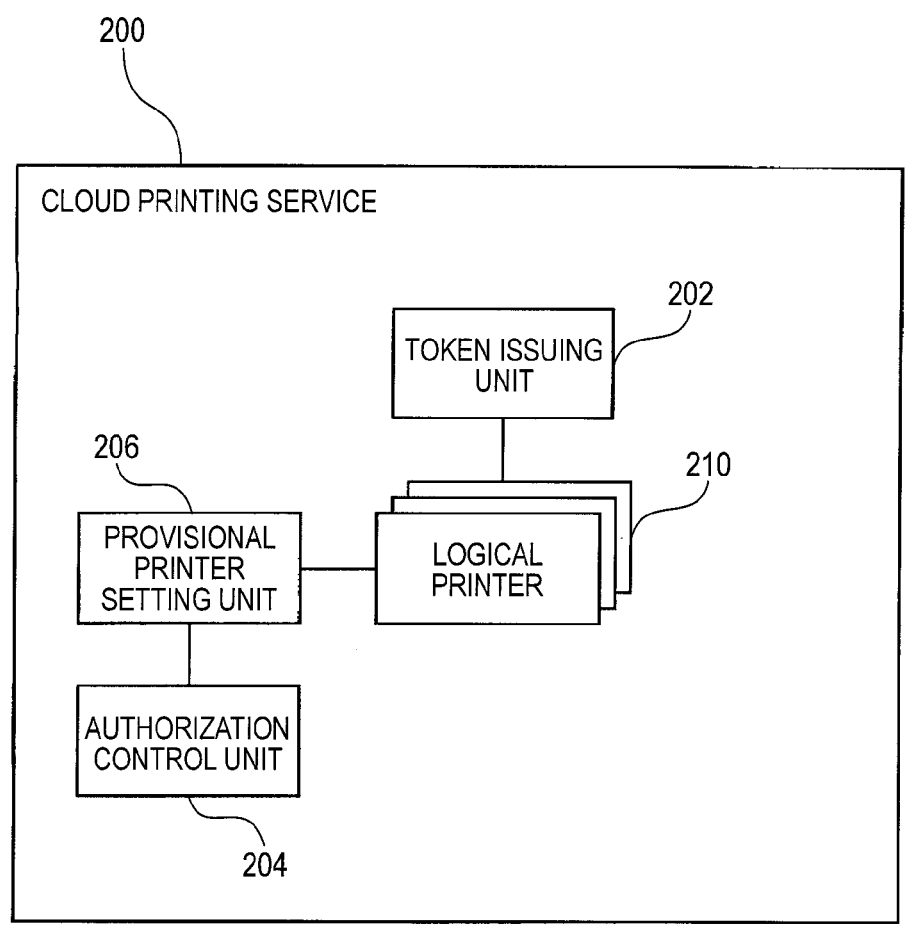
FIG. 14 shows an example functional configuration of a cloud printing service according to the second exemplary embodiment.

Next, an example functional configuration of the cloud printing service 200 which executes the above-described process will be described with reference to FIG. 14. It is noted that FIG. 14 shows only units that deeply relate to the process according to the exemplary embodiment and even common constituent elements of cloud printing services are omitted if they are not very relevant to the process according to the exemplary embodiment.

The cloud printing service 200 is equipped with, as function modules in charge of functions relating to the exemplary embodiment, a token issuing unit 202, an authorization control unit 204, a provisional printer setting unit 206, and logical printers 210. The logical printers 210 have already been described above. The token issuing unit 202 issues an access token for giving provisional printer setting authority in response to a request from the portable terminal 500 (step (5) in FIG. 10). When receiving a setting request containing the access token from the image forming apparatus 100 which has acquired the access token (step (7) in FIG. 10), the authorization control unit 204 authorizes the image forming apparatus 100 to perform the authorization subject manipulation indicated by the authorization information corresponding to the access token. In the exemplary embodiment, the access token is one for giving provisional printer setting authority. Therefore, the authorization control unit 204 judges, from the access token, that the image forming apparatus 100 has authority to make a provisional printer setting on behalf of the portable terminal 500, and instructs the provisional printer setting unit 206 perform a setting manipulation corresponding to the setting request. In response to the instruction, the provisional printer setting unit 206 registers, in the cloud printing service 200, setting information that correlates the physical printer ID of the image forming apparatus 100 as the output destination candidate contained in the setting request with the user ID included in the authorization information.

The above-described exemplary embodiment is just an example, and various modifications are possible within the scope of the invention. For example, as for the process of FIG. 10, the provisional printer setting steps (5)-(9) and the print setting steps (10)-(13) may be reversed in execution order.

In the example of FIG. 10, a document is designated as a print subject by bringing the portable terminal 500 being in a state that the document is opened close to the reader/writer unit of the image forming apparatus 100. However, this is just an example. An alternative method is possible in which a printing process is started by bringing the portable terminal 500 being in a state that a document is not opened close to (or into contact with) the image forming apparatus 100 and a print subject document is specified later. FIG. 15 shows a flow of an example printing process of this method. Steps in FIG. 15 having the same ones in FIG. 10 will be given the same symbols as the latter.

(1') In the flow of FIG. 15, first, the portable terminal 500 being in a state that a document is not opened (e.g., an OS picture or a picture of the cloud printing application 510 is displayed) is brought close to (or into contact with) the reader/writer unit of the image forming apparatus 100

(2') In response to the manipulation that the portable terminal 500 is brought close to (or into contact with) the image forming apparatus 100, the image forming apparatus 100 transmits a selection picture for determination as to whether to perform printing and the physical printer ID ("printer_id") of the image forming apparatus 100 to the portable terminal 500 by NFC or the like. That is, whereas in the process of FIG. 10 only a selection picture is trans-mitted, in this example it is transmitted to the portable terminal 500 together with the physical printer ID. When the user makes a selection to the effect that printing should be performed through the selection picture (step (3)), the selection result is transmitted to the image forming apparatus 100.

(A) The cloud printing application 510 of the portable terminal 500 accesses the cloud printing service 200 and transmits, to the cloud printing service 200, a setting request containing the physical printer ID of the image forming apparatus 100 acquired at step (2') and the user ID (in the cloud printing service 200) of the user of the portable terminal 500. In response to the setting request, the cloud printing service 200 makes a setting (provisional printer setting) for permitting the user corresponding to the user ID to use the image forming apparatus 100 corresponding to the physical printer ID.

(B) Upon completion of the provisional printer setting, the cloud printing application 510 receives designation of a print subject document from the user. For example, if the user designates the cloud repository service 300 as a location where a print subject document exists, the cloud printing application 510 acquires a list of documents for which the user has an access right and has the user specify a print subject from the list. A print subject document may be specified from documents stored in the portable terminal 500. The cloud printing application 510 stores document identification information (e.g., URL) of the designated print subject document.

The cloud printing application 510 receives a print setting from the user at steps (10)-(13) shown in FIG. 10, and transmits a print ticket having the print setting information to the image forming apparatus 100. The print ticket is stored in the image forming apparatus 100 so as to be correlated with the document identification information of the document that was designated as the print subject at step (B).

(14') When the user commands a start of printing, the cloud printing application 510 transmits a print instruction containing the document identification information of the document that was designated as the print subject at step (B).

In response to the instruction, steps (15)-(18) shown in FIG. 11 are executed, whereby a print output of the document is produced by the image forming apparatus 100 with the print setting indicated by the print ticket.

Although in the process of FIG. 15 the portable terminal 500 causes the cloud printing service 200 to make a provisional printer setting at step (A) using the physical printer ID that was acquired from the image forming apparatus 100 at step (2'), this is just an example. Steps (4)-(9) shown in FIG. 10 may be executed instead of step (A) so that the image forming apparatus 100 causes the cloud printing service 200 to make a provisional printer setting using an access token.

In each of the above examples, the portable terminal 500 acquires capability information of the image forming apparatus 100 from the image forming apparatus 100 itself. In contrast, in a second modification shown in FIGS. 16 and 17, the portable terminal 500 acquires capability information of the image forming apparatus 100 from the cloud printing service 200. Steps in FIGS. 16 and 17 having the same ones in FIGS. 10 and 11 will be given the same symbols as the latter.

In the process shown in FIG. 16, at step (2'), the image forming apparatus 100 supplies the physical printer ID of the image forming apparatus 100 to the portable terminal 500 together with a selection picture for determination as to whether to perform printing. At steps (3)-(9), a provisional printer setting for permitting the user of the portable terminal 500 to use the image forming apparatus 100 is made (refer to the description made above with reference to FIG. 10). A provisional printer setting may be made in the same manner as in step (A) shown in FIG. 15 instead of steps (3)-(9).

(11') The cloud printing application 510 of the portable terminal 500 transmits, to the cloud printing service 200, a request for supplying capability information of the image forming apparatus 100. The supply request contains the physical printer ID (identification information) of the image forming apparatus 100. The cloud printing service 200 holds pieces of capability information of respective physical printers registered therein, and reads out the capability information corresponding to the physical printer ID contained in the supply request.

(12') The cloud printing service 200 returns the read-out capability information or print setting picture information that reflects the capability information to the cloud printing application 510. The cloud printing application 510 displays a print setting picture that is based on the capability information of the image forming apparatus 100 on the display device of the portable terminal 500, and receives setting manipulations for respective items in the print setting picture from the user. Then the process moves to the steps shown in FIG. 17.

(14") When the user commands a start of printing after completion of the print setting, the cloud printing application 510 transmits, to the cloud printing service 200, a print instruction in which the document that was displayed at step (1) is designated as a print subject. The print instruction contains the document identification information of the document that was displayed at step (1) and a print ticket representing print setting information that has been input through the print setting picture.

At step (15), in response to the print instruction, the cloud printing service 200 generates print data of the print subject document and transmits a notice containing identification information of the print data to the image forming apparatus 100. At step (16), in response to the notice, the image forming apparatus 100 requests the cloud printing service 200 to supply the print data corresponding to the identification information. At step (17'), in response to the request, the cloud printing service 200 transmits the requested print data and the print ticket corresponding to it to the image forming apparatus 100. The image forming apparatus 100 performs printing by applying the print setting represented by the print ticket to the received print data.

For example, the information processing units of the above-exemplified image forming apparatus 100, cloud printing service 200, and portable terminal 500 are realized by causing a general-purpose computer to run programs that represent processes to be executed by their individual function modules. For example, the term "computer" as used herein means a computer having a circuit configuration (hardware) that a microprocessor such as a CPU, memories (for primary storage) such as a random access memory (RAM) and a read-only memory (ROM), a secondary storage controller for controlling a secondary storage device such as an HDD (hard disk drive), an SSD (solid-state drive), or a flash memory, various I/O (input/output) interfaces, a network interface which performs a control for connection to a wireless or wired network, and other devices are connected to each other by, for example, a bus. A disc drive for reading from and/or writing to a portable disc recording medium such as a CD, a DVD, or a Blu-ray disc, a memory reader/writer for reading from and/or writing to any of various kinds of portable, nonvolatile recording media such as a flash memory, or a like device may be connected to the bus via an I/O interface, for example. The programs that represent the processes to be executed by the above-exemplified individual function modules are stored in the secondary storage device such as a flash memory via a recording medium such as a CD or a DVD or a communication means such as a network and installed in the computer. The above-exemplified function modules are realized when the programs stored in the secondary storage device are read into the RAM and run by the microprocessor such as a CPU.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A printing system comprising:
an information processing apparatus; and
an image forming apparatus,
wherein the information processing apparatus comprises:
an acquiring unit that acquires identification information of the image forming apparatus in a printing service system from the image forming apparatus by a short-range communication; and
a transmitting unit that transmits, to the printing service system, a setting request which contains the identification information of the image forming apparatus acquired by the acquiring unit and identification information of a user in the printing service system and which is a request for making a setting for permitting the user to use the image forming apparatus,
wherein the image forming apparatus comprises:
a holding unit that holds the identification information of the image forming apparatus in the printing service system in such a form that the identification information can be acquired by the acquiring unit of the information processing apparatus,
wherein the printing service system comprises:
a setting unit that, when the setting request is received from the information processing apparatus, sets setting information indicating that the user corresponding to the identification information contained in the setting request can use the image forming apparatus corresponding to the identification information contained in the setting request; and
a print data transmitting unit that, when a print instruction which is issued by the user corresponding to the setting information and in which the image forming apparatus to which the setting information is directed is designated as an output destination is received from the information processing apparatus, transmits print data corresponding to the print instruction to the image forming apparatus,
wherein the setting unit sets an expiration time in such a manner that the expiration time is correlated with the setting information, and
wherein in response to receiving, from the information processing apparatus, before the expiration time, a print instruction which is issued by the user corresponding to the setting information and which designates, as an output destination, the image forming apparatus to which the setting information is directed, the print data transmitting unit transmits print data corresponding to the print instruction to the image forming apparatus.

2. The printing system according to claim 1, wherein the setting unit invalidates the setting information correlated with the expiration time if the expiration time is passed.

3. The printing system according to claim 1, wherein the printing service system further comprises an invalidating unit that invalidates the setting information upon completion of print output of the print data that was transmitted to the image forming apparatus by the print data transmitting unit.

4. The printing system according to claim 1, wherein the printing service system further comprises:
    a lock setting unit that makes a lock setting which permits only the user to use the image forming apparatus when the setting unit has set the setting information;
    a canceling unit that cancels the lock setting set by the lock setting unit if a predetermined condition is satisfied; and
    a control unit that performs a control so that even if a print instruction which is issued by a user other than the user for whom the lock setting is made and in which the image forming apparatus to which the setting information is directed is designated as an output destination is received, print data corresponding to the print instruction is not transmitted to the image forming apparatus in a period from the making of the lock setting to a cancellation of the lock setting.

5. The printing system according to claim 1, wherein the image forming apparatus further comprises:
    a receiving unit that receives the identification information of the user in the printing service system from the information processing apparatus which has received the identification information of the image forming apparatus held by the holding unit; and
    a print data acceptance control unit that performs a control so that print data that is transmitted from the printing service system and is of a user other than the user corresponding to the identification information received by the receiving unit is not accepted.

6. The printing system according to claim 1, wherein the information processing apparatus further comprises a printing commanding unit that, when the acquiring unit acquires the identification information of the image forming apparatus by a short-range communication in a state that a document is displayed on a screen of the information processing apparatus, transmits a print instruction having the document as a print subject to the printing service system.

7. An information processing apparatus comprising:
    an acquiring unit that acquiring identification information of an image forming apparatus in a printing service system from the image forming apparatus; and
    a transmitting unit that transmits, to the printing service system, a setting request which contains the identification information of the image forming apparatus acquired by the acquiring unit and identification information of a user in the printing service system and which is a request for making a setting for permitting the user to use the image forming apparatus,
    wherein the printing service system comprises:
        a setting unit that, when the setting request is received from the information processing apparatus, sets setting information indicating that the user corresponding to the identification information contained in the setting request can use the image forming apparatus corresponding to the identification information contained in the setting request; and
        a print data transmitting unit that, when a print instruction which is issued by the user corresponding to the setting information and in which the image forming apparatus to which the setting information is directed is designated as an output destination is received from the information processing apparatus, transmits print data corresponding to the print instruction to the image forming apparatus,
    wherein the setting unit sets an expiration time in such a manner that the expiration time is correlated with the setting information, and
    wherein in response to receiving, from the information processing apparatus, before the expiration time, a print instruction which is issued by the user corresponding to the setting information and which designates, as an output destination, the image forming apparatus to which the setting information is directed, the print data transmitting unit transmits print data corresponding to the print instruction to the image forming apparatus.

8. A non-transitory computer readable medium storing a program causing a computer to function as:
    an acquiring unit that acquires identification information of an image forming apparatus in a printing service system from the image forming apparatus; and
    a transmitting unit that transmits, to the printing service system, a setting request which contains the identification information of the image forming apparatus acquired by the acquiring unit and identification information of a user in the printing service system and which is a request for making a setting for permitting the user to use the image forming apparatus,
    wherein the printing service system comprises:
        a setting unit that, when the setting request is received from the information processing apparatus, sets setting information indicating that the user corresponding to the identification information contained in the setting request can use the image forming apparatus corresponding to the identification information contained in the setting request; and
        a print data transmitting unit that, when a print instruction which is issued by the user corresponding to the setting information and in which the image forming apparatus to which the setting information is directed is designated as an output destination is received from the information processing apparatus, transmits print data corresponding to the print instruction to the image forming apparatus,
    wherein the setting unit sets an expiration time in such a manner that the expiration time is correlated with the setting information, and
    wherein in response to receiving, from the information processing apparatus, before the expiration time, a print instruction which is issued by the user corresponding to the setting information and which designates, as an output destination, the image forming apparatus to which the setting information is directed, the print data transmitting unit transmits print data corresponding to the print instruction to the image forming apparatus.

9. An image forming apparatus which cooperates with an information processing apparatus, the information processing apparatus comprising:
    an acquiring unit that acquires identification information of the image forming apparatus in a printing service system from the image forming apparatus; and a transmitting unit that transmits, to the printing service system, a setting request which contains the identification information of the image forming apparatus acquired by the acquiring unit and identification information of a user in the printing service system and which is a request for making a setting for permitting the user to use the image forming apparatus, wherein the image forming apparatus comprises:
  a holding unit that holds the identification information of the image forming apparatus in the printing service system in such a form that the identification information can be acquired by the acquiring unit of the information processing apparatus, wherein the printing service system comprises:
  a setting unit that, when the setting request is received from the information processing apparatus, sets setting information indicating that the user corresponding to the identification information contained in the setting request can use the image forming apparatus corresponding to the identification information contained in the setting request; and
  a print data transmitting unit that, when a print instruction which is issued by the user corresponding to the setting information and in which the image forming apparatus to which the setting information is directed is designated as an output destination is received from the information processing apparatus, transmits print data corresponding to the print instruction to the image forming apparatus, wherein the setting unit sets an expiration time in such a manner that the expiration time is correlated with the setting information, and wherein in response to receiving, from the information processing apparatus, before the expiration time, a print instruction which is issued by the user corresponding to the setting information and which designates, as an output destination, the image forming apparatus to which the setting information is directed, the print data transmitting unit transmits print data corresponding to the print instruction to the image forming apparatus.

10. The image forming apparatus according to claim 9, further comprising:
a unit that causes the information processing apparatus to acquire the identification information of the image forming apparatus held by the holding unit;
a receiving unit that receives the identification information of the user from the information processing apparatus; and
a print data acceptance control unit that performs a control so that print data that is transmitted from the printing service system and is of a user other than the user corresponding to the identification information received by the receiving unit is not accepted.

11. A printing system comprising:
an information processing apparatus; and
an image forming apparatus,
wherein the information processing apparatus comprises:
  an acquiring unit that acquires identification information of the image forming apparatus in a printing service system from the image forming apparatus by a short-range communication; and
  a transmitting unit that transmits, to the printing service system, a setting request which contains the identification information of the image forming apparatus acquired by the acquiring unit and identification information of a user in the printing service system, wherein in response to the setting request, the printing service system makes a setting for permitting the user to use the image forming apparatus, wherein the image forming apparatus comprises:
  a holding unit that holds the identification information of the image forming apparatus in the printing service system in such a form that the identification information can be acquired by the acquiring unit of the information processing apparatus, wherein the printing service system comprises:
  a setting unit that, when the setting request is received from the information processing apparatus, sets setting information indicating that the user corresponding to the identification information contained in the setting request can use the image forming apparatus corresponding to the identification information contained in the setting request;
  a print data transmitting unit that, when a print instruction which is issued by the user corresponding to the setting information and in which the image forming apparatus to which the setting information is directed is designated as an output destination is received from the information processing apparatus, transmits print data corresponding to the print instruction to the image forming apparatus;
  an invalidating unit that invalidates the setting information upon completion of print output of the print data that was transmitted to the image forming apparatus by the print data transmitting unit, wherein in response to invalidating the setting information, the printing service system no longer accepts a print instruction, which is issued by the user, and has the image forming apparatus as an output destination;
  a lock setting unit that makes a lock setting which permits only the user to use the image forming apparatus when the setting unit has set the setting information;
  a canceling unit that cancels the lock setting set by the lock setting unit upon completion of print output of the print data; and
  a control unit that performs a control so that even if a print instruction which is issued by a user other than the user for whom the lock setting is made and in which the image forming apparatus to which the setting information is directed is designated as an output destination is received, print data corresponding to the print instruction is not transmitted to the image forming apparatus in a period from the making of the lock setting to a cancellation of the lock setting.

12. An information processing apparatus comprising:
an acquiring unit that acquiring identification information of an image forming apparatus in a printing service system from the image forming apparatus; and
a transmitting unit that transmits, to the printing service system, a setting request which contains the identification information of the image forming apparatus acquired by the acquiring unit and identification information of a user in the printing service system, wherein in response to the setting request, the printing service system makes a setting for permitting the user to use the image forming apparatus, wherein the printing service system comprises:
  a setting unit that, when the setting request is received from the information processing apparatus, sets setting information indicating that the user corresponding to the identification information contained in the setting request can use the image forming apparatus corresponding to the identification information contained in the setting request;
a print data transmitting unit that transmits print data corresponding to the print instruction to the image forming apparatus;
an invalidating unit that invalidates the setting information upon completion of print output of the print data that was transmitted to the image forming apparatus by the print data transmitting unit,
wherein in response to invalidating the setting information, the printing service system no longer accepts a print instruction, which is issued by the user, and has the image forming apparatus as an output destination;
a lock setting unit that makes a lock setting which permits only the user to use the image forming apparatus when the setting unit has set the setting information;
a canceling unit that cancels the lock setting set by the lock setting unit upon completion of print output of the print data; and
a control unit that performs a control so that even if a print instruction which is issued by a user other than the user for whom the lock setting is made and in which the image forming apparatus to which the setting information is directed is designated as an output destination is received, print data corresponding to the print instruction is not transmitted to the image forming apparatus in a period from the making of the lock setting to a cancellation of the lock setting.

13. A non-transitory computer readable medium storing a program causing a computer to function as:
an acquiring unit that acquires identification information of an image forming apparatus in a printing service system from the image forming apparatus; and
a transmitting unit that transmits, to the printing service system, a setting request which contains the identification information of the image forming apparatus acquired by the acquiring unit and identification information of a user in the printing service system,
wherein in response to the setting request, the printing service system makes a setting for permitting the user to use the image forming apparatus,
wherein the printing service system comprises:
a setting unit that, when the setting request is received from the information processing apparatus, sets setting information indicating that the user corresponding to the identification information contained in the setting request can use the image forming apparatus corresponding to the identification information contained in the setting request;
a print data transmitting unit that transmits print data corresponding to the print instruction to the image forming apparatus;
an invalidating unit that invalidates the setting information upon completion of print output of the print data that was transmitted to the image forming apparatus by the print data transmitting unit,
wherein in response to invalidating the setting information, the printing service system no longer accepts a print instruction, which is issued by the user, and has the image forming apparatus as an output destination;
a lock setting unit that makes a lock setting which permits only the user to use the image forming apparatus when the setting unit has set the setting information;
a canceling unit that cancels the lock setting set by the lock setting unit upon completion of print output of the print data; and
a control unit that performs a control so that even if a print instruction which is issued by a user other than the user for whom the lock setting is made and in which the image forming apparatus to which the setting information is directed is designated as an output destination is received, print data corresponding to the print instruction is not transmitted to the image loaning apparatus in a period from the making of the lock setting to a cancellation of the lock setting.

14. A printing system comprising:
an information processing apparatus; and
an image forming apparatus,
wherein the information processing apparatus comprises:
an acquiring unit that acquires identification information of the image forming apparatus in a printing service system from the image forming apparatus by a short-range communication; and
a transmitting unit that transmits, to the printing service system, a setting request which contains the identification information of the image forming apparatus acquired by the acquiring unit and identification information of a user in the printing service system,
wherein in response to the setting request, the printing service system makes a setting for permitting the user to use the image forming apparatus,
wherein the image forming apparatus comprises:
a holding unit that holds the identification information of the image forming apparatus in the printing service system in such a form that the identification information can be acquired by the acquiring unit of the information processing apparatus, and
wherein the information processing apparatus further comprises:
a printing commanding unit that, when the information processing apparatus is brought close to the image forming apparatus in a state that a document is editably opened by a document edit application and displayed on a screen of the information processing apparatus, transmits a print instruction having the document as a print subject to the printing service system.

15. An information processing apparatus comprising:
an acquiring unit that acquiring identification information of an image forming apparatus in a printing service system from the image forming apparatus; and
a transmitting unit that transmits, to the printing service system, a setting request which contains the identification information of the image forming apparatus acquired by the acquiring unit and identification information of a user in the printing service system,
wherein in response to the setting request, the printing service system makes a setting for permitting the user to use the image forming apparatus; and
a printing commanding unit that, when the information processing apparatus is brought close to the image forming apparatus in a state that a document is editably opened by a document edit application and displayed on a screen of the information processing apparatus, transmits a print instruction having the document as a print subject to the printing service system.

16. A non-transitory computer readable medium storing a program causing a processor of an information processing apparatus to function as:
   an acquiring unit that acquires identification information of an image forming apparatus in a printing service system from the image forming apparatus;
   a transmitting unit that transmits, to the printing service system, a setting request which contains the identification information of the image forming apparatus acquired by the acquiring unit and identification information of a user in the printing service system,
   wherein in response to the setting request, the printing service system makes a setting for permitting the user to use the image forming apparatus; and
   a printing commanding unit that, when the information processing apparatus is brought close to the image forming apparatus in a state that a document is editably opened by a document edit application and displayed on a screen of the information processing apparatus, transmits a print instruction having the document as a print subject to the printing service system.

* * * * *